(12) United States Patent
Gillen et al.

(10) Patent No.: US 11,526,830 B2
(45) Date of Patent: Dec. 13, 2022

(54) CONCEPTS FOR ELECTRONIC DOOR HANGERS

(71) Applicant: United Parcel Service of America, Inc., Atlanta, GA (US)

(72) Inventors: Robert J. Gillen, Alpharetta, GA (US); Kenneth Bradley Gubler, Marietta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 191 days.

(21) Appl. No.: 16/221,031

(22) Filed: Dec. 14, 2018

(65) Prior Publication Data

US 2019/0130344 A1  May 2, 2019

Related U.S. Application Data

(63) Continuation of application No. 14/548,389, filed on Nov. 20, 2014, now Pat. No. 10,192,190.
(Continued)

(51) Int. Cl.
*G06Q 10/08* (2012.01)
*G06Q 10/06* (2012.01)
(Continued)

(52) U.S. Cl.
CPC ... *G06Q 10/083* (2013.01); *G06Q 10/063114* (2013.01); *G06Q 10/08* (2013.01);
(Continued)

(58) Field of Classification Search
CPC ............. G06Q 50/28; G06Q 10/063114
(Continued)

(56) References Cited

U.S. PATENT DOCUMENTS 3,721,096 A   3/1973  Deckert et al.
3,876,059 A   4/1975  Durst
(Continued)

FOREIGN PATENT DOCUMENTS

EP   2075769 A2 *  7/2009  ........... A47G 29/141
JP   10-207956 A    8/1998
(Continued)

OTHER PUBLICATIONS

Aarinen et al., "Shop2Box Concept and Radio Frequency Identification," Jan. 1, 2022. IEEE International Conference on Systems, Man and Cybernetics (vol. 3, p. 6 pp. vol. 3). (Year: 2002).*
(Continued)

*Primary Examiner* — Jeff Zimmerman
*Assistant Examiner* — Hunter A Molnar
(74) *Attorney, Agent, or Firm* — Shook, Hardy & Bacon L.L.P.

(57) ABSTRACT

Computer program products, methods, systems, apparatus, and computing entities are provided. In one embodiment, a connection between an electronic door hanger and a customer computing entity can be established at a customer's location. With a connection established, information about an attempted (e.g., successful/unsuccessful) pick-up or delivery can be automatically provided to the customer computing entity.

15 Claims, 11 Drawing Sheets

Related U.S. Application Data

(60) Provisional application No. 61/906,511, filed on Nov. 20, 2013.

(51) Int. Cl.
*G06Q 50/28* (2012.01)
*G06Q 20/14* (2012.01)
*G06Q 20/18* (2012.01)

(52) U.S. Cl.
CPC ....... *G06Q 10/0833* (2013.01); *G06Q 20/145* (2013.01); *G06Q 20/18* (2013.01); *G06Q 50/28* (2013.01)

(58) Field of Classification Search
USPC ...................................................... 705/330
See application file for complete search history.

(56) References Cited

U.S. PATENT DOCUMENTS

| | | |
|---|---|---|
| 3,933,031 A | 1/1976 | Uhlarik |
| 4,111,601 A | 9/1978 | Richard |
| 5,153,842 A | 10/1992 | Dlugos et al. |
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,460,110 A | 10/1995 | Eronen et al. |
| 5,597,116 A * | 1/1997 | Morris ............... A47G 29/1209 232/20 |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,668,543 A | 9/1997 | Jones |
| 5,711,670 A | 1/1998 | Barr |
| 5,786,748 A | 7/1998 | Nikolic et al. |
| 5,835,377 A | 11/1998 | Bush |
| 5,884,272 A | 3/1999 | Walker et al. |
| 6,029,140 A | 2/2000 | Martin et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,422,506 B1 | 7/2002 | Colby |
| 6,442,589 B1 | 8/2002 | Takahashi et al. |
| 6,463,420 B1 | 10/2002 | Guidice et al. |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,606,604 B1 | 8/2003 | Dutta |
| 6,618,668 B1 | 9/2003 | Laird |
| 6,634,551 B2 | 10/2003 | Barta et al. |
| 6,683,542 B1 | 1/2004 | Jones |
| 6,700,507 B2 | 3/2004 | Jones |
| 6,701,299 B2 | 3/2004 | Kraisser et al. |
| 6,714,859 B2 | 3/2004 | Jones |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,765,487 B1 | 7/2004 | Holmes et al. |
| 6,772,130 B1 | 8/2004 | Karbowski et al. |
| 6,804,606 B2 | 10/2004 | Jones |
| 6,845,448 B1 | 1/2005 | Chaganti et al. |
| 6,859,722 B2 | 2/2005 | Jones |
| 6,902,109 B2 | 6/2005 | Barta et al. |
| 6,904,359 B2 | 6/2005 | Jones |
| 6,931,314 B2 | 8/2005 | Holland et al. |
| 6,952,645 B1 | 10/2005 | Jones |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,994,253 B2 | 2/2006 | Miller et al. |
| 7,028,895 B2 | 4/2006 | Ashaari |
| 7,030,781 B2 | 4/2006 | Jones |
| 7,031,959 B2 | 4/2006 | Gamer et al. |
| 7,039,813 B2 | 5/2006 | Algazi et al. |
| 7,152,375 B1 | 12/2006 | Mastro et al. |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,257,552 B1 | 8/2007 | Franco |
| 7,305,404 B2 | 12/2007 | Owens et al. |
| 7,312,702 B1 | 12/2007 | Willms et al. |
| 7,331,248 B2 | 2/2008 | Maresca et al. |
| 7,376,598 B2 | 5/2008 | Estes et al. |
| 7,385,499 B2 | 6/2008 | Horton et al. |
| 7,422,149 B2 | 9/2008 | Aptekar |
| 7,479,899 B2 | 1/2009 | Horstemeyer |
| 7,501,946 B2 | 3/2009 | Lanigan et al. |
| 7,511,617 B2 | 3/2009 | Burman et al. |
| 7,528,722 B2 | 5/2009 | Nelson |
| 7,531,163 B2 | 5/2009 | Samadpour |
| 7,542,972 B2 | 6/2009 | Owens et al. |
| 7,574,366 B2 | 8/2009 | Burman et al. |
| 7,580,845 B2 | 8/2009 | Burman et al. |
| 7,647,231 B2 | 1/2010 | Kuebert et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins et al. |
| 7,912,854 B2 | 3/2011 | Owens et al. |
| 7,925,524 B2 | 4/2011 | Florence |
| 7,962,422 B1 | 6/2011 | Melechko et al. |
| 7,969,306 B2 | 6/2011 | Ebert et al. |
| 7,984,289 B2 | 7/2011 | Orbke et al. |
| 7,996,328 B1 | 8/2011 | Lundberg et al. |
| 8,015,023 B1 | 9/2011 | Lee et al. |
| 8,027,933 B2 | 9/2011 | Lou et al. |
| 8,036,993 B2 | 10/2011 | Estes |
| 8,103,521 B2 | 1/2012 | Kuebert et al. |
| 8,103,716 B2 | 1/2012 | Boyce et al. |
| 8,117,462 B2 | 2/2012 | Snapp et al. |
| 8,131,652 B2 | 3/2012 | Gullo et al. |
| 8,140,551 B2 | 3/2012 | Gamer et al. |
| 8,140,592 B2 | 3/2012 | Scott et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |

(56) References Cited

U.S. PATENT DOCUMENTS

| | | | |
|---|---|---|---|
| 8,291,234 B2 | 10/2012 | Snapp et al. | |
| 8,340,978 B2 | 12/2012 | Wade | |
| 8,352,551 B2 | 1/2013 | Campbell et al. | |
| 8,356,187 B2 | 1/2013 | Cook et al. | |
| 8,364,953 B2 | 1/2013 | Bullard, Jr. | |
| 8,380,641 B1 | 2/2013 | Bennett et al. | |
| 8,386,516 B2 | 2/2013 | Owens et al. | |
| 8,413,882 B1 | 4/2013 | Nidamarthi et al. | |
| 8,463,568 B1 | 6/2013 | Wynn | |
| 8,482,411 B1* | 7/2013 | Brown | E05B 45/005 340/542 |
| 8,489,520 B2 | 7/2013 | Kuebert et al. | |
| 8,577,802 B1 | 11/2013 | Nichols et al. | |
| 8,731,699 B2 | 5/2014 | Nagy et al. | |
| 8,736,633 B2 | 5/2014 | Gurusamy | |
| 8,823,795 B1 | 9/2014 | Scalisi et al. | |
| 9,032,032 B2 | 5/2015 | Mills et al. | |
| 10,121,118 B1 | 11/2018 | Kim et al. | |
| 2001/0000108 A1 | 4/2001 | Perry | |
| 2001/0042024 A1 | 11/2001 | Rogers | |
| 2001/0051885 A1 | 12/2001 | Nardulli et al. | |
| 2002/0007299 A1 | 1/2002 | Florence | |
| 2002/0010634 A1 | 1/2002 | Roman et al. | |
| 2002/0013744 A1 | 1/2002 | Tsunenari et al. | |
| 2002/0016726 A1 | 2/2002 | Ross | |
| 2002/0019761 A1 | 2/2002 | Lidow | |
| 2002/0032573 A1 | 3/2002 | Williams et al. | |
| 2002/0032612 A1 | 3/2002 | Williams et al. | |
| 2002/0032623 A1 | 3/2002 | Wheeler et al. | |
| 2002/0070882 A1 | 6/2002 | Jones | |
| 2002/0073039 A1 | 6/2002 | Ogg et al. | |
| 2002/0082770 A1 | 6/2002 | Jones | |
| 2002/0087371 A1 | 7/2002 | Abendroth | |
| 2002/0103724 A1 | 8/2002 | Huxter | |
| 2002/0107820 A1* | 8/2002 | Huxter | G06Q 30/0601 705/402 |
| 2002/0111914 A1 | 8/2002 | Terada et al. | |
| 2002/0120475 A1 | 8/2002 | Morimoto | |
| 2002/0130065 A1 | 9/2002 | Bloom | |
| 2002/0147919 A1 | 10/2002 | Gentry | |
| 2002/0156645 A1 | 10/2002 | Hansen | |
| 2002/0156846 A1 | 10/2002 | Rawat et al. | |
| 2002/0165729 A1 | 11/2002 | Kuebert et al. | |
| 2002/0178074 A1 | 11/2002 | Bloom | |
| 2002/0180582 A1* | 12/2002 | Nielsen | G07C 9/00182 340/5.6 |
| 2003/0003936 A1 | 1/2003 | Tighe | |
| 2003/0004893 A1 | 1/2003 | Blaesche | |
| 2003/0036938 A1 | 2/2003 | Dutta et al. | |
| 2003/0037009 A1 | 2/2003 | Tobin et al. | |
| 2003/0097287 A1 | 5/2003 | Franz et al. | |
| 2003/0110170 A1 | 6/2003 | Matsuoka | |
| 2003/0114206 A1 | 6/2003 | Timothy et al. | |
| 2003/0182017 A1 | 9/2003 | O'donohue et al. | |
| 2003/0193414 A1 | 10/2003 | Jones | |
| 2004/0015393 A1* | 1/2004 | Fong | A47G 29/141 705/13 |
| 2004/0030478 A1 | 2/2004 | Holland et al. | |
| 2004/0073499 A1 | 4/2004 | Martin et al. | |
| 2004/0093312 A1 | 5/2004 | Cordery et al. | |
| 2004/0117326 A1 | 6/2004 | Amato | |
| 2004/0133446 A1 | 7/2004 | Myrick et al. | |
| 2004/0149824 A1 | 8/2004 | Miller et al. | |
| 2004/0158351 A1 | 8/2004 | Rivalto | |
| 2004/0199656 A1 | 10/2004 | Pintsov | |
| 2004/0211834 A1 | 10/2004 | Fleckenstein et al. | |
| 2004/0227630 A1 | 11/2004 | Shannon et al. | |
| 2004/0241644 A1 | 12/2004 | Samadpour | |
| 2004/0254802 A1* | 12/2004 | Miller | G07F 17/12 705/337 |
| 2004/0254811 A1 | 12/2004 | Horstemeyer | |
| 2004/0260470 A1 | 12/2004 | Rast | |
| 2005/0004877 A1 | 1/2005 | Mclellan et al. | |
| 2005/0038758 A1 | 2/2005 | Hilbush et al. | |
| 2005/0043845 A1 | 2/2005 | Wiechers | |
| 2005/0071258 A1 | 3/2005 | Kumakawa | |
| 2005/0080638 A1 | 4/2005 | Maseruka | |
| 2005/0082752 A1 | 4/2005 | Acosta | |
| 2005/0104716 A1 | 5/2005 | Simms et al. | |
| 2005/0177387 A1 | 8/2005 | Mojsa | |
| 2005/0216553 A1 | 9/2005 | Mallonee et al. | |
| 2005/0251402 A1 | 11/2005 | Olsen et al. | |
| 2006/0010037 A1 | 1/2006 | Angert et al. | |
| 2006/0041481 A1 | 2/2006 | Stowe | |
| 2006/0047610 A1 | 3/2006 | Parkos et al. | |
| 2006/0069601 A1 | 3/2006 | Simon et al. | |
| 2006/0085273 A1 | 4/2006 | Mayer et al. | |
| 2006/0092040 A1 | 5/2006 | Fishkin et al. | |
| 2006/0097896 A1 | 5/2006 | Jones | |
| 2006/0229895 A1* | 10/2006 | Kodger | G06Q 10/08 705/333 |
| 2006/0248941 A1 | 11/2006 | Maresca et al. | |
| 2006/0255136 A1 | 11/2006 | Wagner et al. | |
| 2006/0282277 A1 | 12/2006 | Ng | |
| 2007/0005452 A1 | 1/2007 | Klingenberg et al. | |
| 2007/0064897 A1 | 3/2007 | Lee | |
| 2007/0078797 A1 | 4/2007 | Won et al. | |
| 2007/0083410 A1 | 4/2007 | Hanna | |
| 2007/0133876 A1 | 6/2007 | Chande et al. | |
| 2007/0150533 A1 | 6/2007 | Krause et al. | |
| 2007/0156415 A1 | 7/2007 | Foth et al. | |
| 2007/0202802 A1 | 8/2007 | Kallio et al. | |
| 2007/0257774 A1* | 11/2007 | Stumpert | G06Q 10/08 340/7.1 |
| 2008/0004995 A1 | 1/2008 | Klingenberg et al. | |
| 2008/0133261 A1 | 6/2008 | Ray | |
| 2008/0154781 A1 | 6/2008 | Kumar | |
| 2008/0172305 A1 | 7/2008 | Estes et al. | |
| 2008/0210749 A1 | 9/2008 | Skaaksrud et al. | |
| 2008/0221913 A1 | 9/2008 | Cook et al. | |
| 2008/0281719 A1 | 11/2008 | Hall et al. | |
| 2008/0319970 A1 | 12/2008 | Garner et al. | |
| 2008/0320092 A1 | 12/2008 | Campbell et al. | |
| 2009/0012802 A1 | 1/2009 | Pinney | |
| 2009/0046892 A1 | 2/2009 | Avant et al. | |
| 2009/0106124 A1 | 4/2009 | Yang | |
| 2009/0138730 A1 | 5/2009 | Cook et al. | |
| 2009/0146832 A1 | 6/2009 | Ebert et al. | |
| 2009/0164295 A1 | 6/2009 | Sion | |
| 2009/0166403 A1* | 7/2009 | Volpe | G07C 9/00912 235/375 |
| 2009/0173672 A1 | 7/2009 | Avant et al. | |
| 2009/0179735 A1* | 7/2009 | Van Rysselberghe | G06Q 30/0601 340/5.73 |
| 2009/0187489 A1 | 7/2009 | Mallick et al. | |
| 2009/0269760 A1 | 10/2009 | Samadpour | |
| 2009/0281929 A1 | 11/2009 | Boitet et al. | |
| 2009/0314835 A1 | 12/2009 | Jackson | |
| 2009/0319078 A1 | 12/2009 | Jackson | |
| 2009/0326971 A1 | 12/2009 | Piccinini et al. | |
| 2009/0327361 A1 | 12/2009 | Mills et al. | |
| 2010/0004960 A1 | 1/2010 | Frankenberg et al. | |
| 2010/0045456 A1 | 2/2010 | Koennecke et al. | |
| 2010/0049536 A1 | 2/2010 | Quine et al. | |
| 2010/0057592 A1 | 3/2010 | Moir et al. | |
| 2010/0057593 A1 | 3/2010 | Moir et al. | |
| 2010/0076903 A1 | 3/2010 | Klingenberg et al. | |
| 2010/0100497 A1 | 4/2010 | Kuebert et al. | |
| 2010/0121689 A1 | 5/2010 | Wallace et al. | |
| 2010/0185565 A1 | 7/2010 | Wade | |
| 2010/0211444 A1 | 8/2010 | Spear | |
| 2010/0253519 A1* | 10/2010 | Brackmann | G01S 19/35 340/572.1 |
| 2010/0299278 A1 | 11/2010 | Kriss et al. | |
| 2011/0004562 A1 | 1/2011 | Hennessy et al. | |
| 2011/0022532 A1 | 1/2011 | Kriss | |
| 2011/0041573 A1* | 2/2011 | Giles | G07C 9/00896 70/278.1 |
| 2011/0060552 A1 | 3/2011 | Ono | |
| 2011/0092161 A1 | 4/2011 | Dotan | |
| 2011/0125665 A1 | 5/2011 | Kadaba | |
| 2011/0238195 A1 | 9/2011 | Nagy et al. | |

(56) References Cited

U.S. PATENT DOCUMENTS

| | | |
|---|---|---|
| 2011/0270714 A1 | 11/2011 | Myrick et al. |
| 2011/0307354 A1 | 12/2011 | Erman et al. |
| 2012/0016948 A1 | 1/2012 | Sinha |
| 2012/0030133 A1 | 2/2012 | Rademaker |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0173308 A1 | 7/2012 | Brown et al. |
| 2012/0179622 A1 | 7/2012 | Amato |
| 2012/0235791 A1 | 9/2012 | Donlan et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | Mccullough et al. |
| 2013/0016636 A1 | 1/2013 | Berger et al. |
| 2013/0024525 A1 | 1/2013 | Brady et al. |
| 2013/0066744 A1 | 3/2013 | Higgins et al. |
| 2013/0073336 A1 | 3/2013 | Heath |
| 2013/0113819 A1 | 5/2013 | Gurusamy |
| 2013/0144428 A1 | 6/2013 | Irwin et al. |
| 2013/0212037 A1 | 8/2013 | Briggman et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262336 A1 | 10/2013 | Wan et al. |
| 2014/0052661 A1 | 2/2014 | Shakes et al. |
| 2014/0180959 A1 | 6/2014 | Gillen et al. |
| 2014/0222711 A1 | 8/2014 | Tibbs et al. |
| 2014/0266668 A1 | 9/2014 | Blankenship et al. |
| 2014/0266669 A1 | 9/2014 | Fadell et al. |
| 2015/0081587 A1 | 3/2015 | Gillen |
| 2015/0120598 A1 | 4/2015 | Fadell et al. |
| 2015/0120601 A1* | 4/2015 | Fee .................... G06Q 10/0836 705/339 |
| 2015/0134560 A1 | 5/2015 | Krishnaiahsetty |
| 2015/0142691 A1 | 5/2015 | Gillen et al. |
| 2015/0142692 A1 | 5/2015 | Gillen et al. |
| 2017/0262798 A1 | 9/2017 | Kosseifi et al. |
| 2017/0301200 A1 | 10/2017 | Siminoff |
| 2018/0285811 A1 | 10/2018 | Shaw et al. |
| 2018/0330322 A1 | 11/2018 | Danyluk et al. |
| 2019/0279151 A1 | 9/2019 | Felice et al. |
| 2020/0097902 A1 | 3/2020 | Anders et al. |

FOREIGN PATENT DOCUMENTS

| | | |
|---|---|---|
| JP | 11-139540 A | 5/1999 |
| JP | 2000-339373 A | 12/2000 |
| JP | 2001-14393 A | 1/2001 |
| JP | 2001-22678 A | 1/2001 |
| JP | 2002-42008 A | 2/2002 |
| JP | 2002-56307 A | 2/2002 |
| WO | 00/19170 A1 | 4/2000 |
| WO | 00/19171 A1 | 4/2000 |
| WO | 00/30014 A1 | 5/2000 |
| WO | 00/46726 A2 | 8/2000 |
| WO | 0046728 A2 | 8/2000 |
| WO | 00/52422 A1 | 9/2000 |
| WO | 01/16889 A1 | 3/2001 |
| WO | 01/29778 A1 | 4/2001 |
| WO | 01/35344 A2 | 5/2001 |
| WO | 01/39031 A2 | 5/2001 |
| WO | 01/65451 A1 | 9/2001 |
| WO | 01/65454 A2 | 9/2001 |
| WO | 01/65523 A1 | 9/2001 |
| WO | 01/65524 A1 | 9/2001 |
| WO | 01/67344 A1 | 9/2001 |
| WO | 01/72109 A2 | 10/2001 |
| WO | 01/84359 A2 | 11/2001 |
| WO | 01/88831 A2 | 11/2001 |
| WO | 01/97101 A2 | 12/2001 |
| WO | 02/07104 A1 | 1/2002 |
| WO | 02/17045 A2 | 2/2002 |
| WO | 02/052378 A2 | 7/2002 |
| WO | 2004/015518 A2 | 2/2004 |
| WO | 2011/150971 A1 | 12/2011 |
| WO | 2012/129529 A1 | 9/2012 |
| WO | 2019/232314 A1 | 12/2019 |

OTHER PUBLICATIONS

"ASP V16-System Walker List Works Manual", line 5, 3.4 Start up and termination of ListWORKS writer, p. 88.

Brewin, et al., "Follow that Package!", Article, Computer Worid, Available at: <www.computerworld.com/printthis/2001// 0,4814,58696,00.html>, Mar. 19, 2001, pp. 1-5.

Caminiti, et al., "United Parcel Service Introduces Advanced Label Imaging System", Business Wire, Section 1, Nov. 29, 1989, 1 page.

"CPS University: Plasticology 101", Container & Packaging Supply, Inc., Available at: <https://www.containerandpackaging.com/resources/plasticology>. May 26, 2012, pp. 1-6.

Declaration of David Ellison Pertaining to UPS and Mailbox etc. pre-filing activities from Mar. 2001-Nov. 1, 2002.

Demarco, Donna, "E-tail Presents Can be Tougher to Send Back than Order", Journal, Knight-Ridder/Tribune Business News, The Dialog Corporation, US, Dec. 28, 1999.

El Portal Del Transporte, "Fedex Insight Empowers Customers with Enhanced Shipment Visibility and Control", Article, Retrieved from: <http://www.transportando.net/newsabril_completa.htm>, Apr. 11, 2001, pp. 9-10.

FedEx, "FedEx Mobile Ship", Available at: <http://www.fedex.com/us/mobile/label.htm,redirected to http://mobilesolutions.fedex.com/shipping-label.html>, Retrieved on Sep. 25, 2013, 2 pages.

FedEx, "RPS Adds Automated Package Pick-up to Redesigned Web Site", Available at: <www.fedex.com/us/about/ground/pressreleases/pressrelease111198.html?link=4>, Retrieved on Sep. 10, 2003.

Final Office Action received for U.S. Appl. No. 14/548,389, dated Sep. 25, 2017, 19 pages.

Final Office Action received for U.S. Appl. No. 14/548,397, dated Nov. 30, 2017, 19 pages.

Frontline Solutions, "Fed Ex Improves Internal, External Operations", Article, Fairfax, Virginia and Memphis, Tennessee, Available at: <http://www.frontlinemagazine.com/art_th/04052001.htx>, Apr. 5, 2001, pp. 1-2.

Gao et al., "Cyber-Physical-Social Systems: Harnessing the Crowdsourcing Power of Social Media for Disaster Relief", IEEE Intelligent Systems, IEEE Computer Society, 2011, pp. 10-14.

Harrington, Lisa, "The US Postal Service Gets Serious about Serving Business in the New Economy", Transportation & Distribution, vol. 41, No. 5, Penton Publishing, Inc., United States of America, May 2000, p. 2.

Henderson, Timothy, "Buy.com Boosts Returns Process Efficiency with New Solution", ProQuest Info & Learning, vol. 82, No. 11, Nov. 2000, pp. 72-76.

Henderson, Timothy P., "Scheduling Software Helps Webvan Meet 30-Minute Delivery Window, Descartes", Available at: <www.stores.org>, Jul. 2000.

Ipventure, "Schedule Distribution Routes and Timeslots", IP Ventures, Available at: <https://www.ipventure.com/onlineorder/distribution php>, Retrieved on Apr. 16, 2008.

"Is Your Gadget Dead On Arrival?", PIRA, New Scientist, vol. 217, No. 2904, Feb. 16, 2013, p. 23.

Kihon, Kara Jissen., "Made Business Seikou No Tameno Kanpeki Guide—How To E-Commerce", p. 60.

Lindsay, Bruce R., "Congressional Research Service, Social Media and Disasters: Current Uses, Future Options, and Policy Considerations", CRS Report for Congress, Congressional Research Service., Sep. 6, 2011, 10 pages.

(56) References Cited

OTHER PUBLICATIONS

Many Happy Returns—UPS Unveils Advanced Outline Returns Solution, Accession No. 12921102, Business Wire, Sep. 20, 2000.
McGee-Lennon et al., "Reminders that make sense: Designing multimodal notifications for the home", Pervasive Computing Technologies for Healthcare (PervasiveHealth), 5th International Conference on. IEEE, 2011, 7 pages.
Non-Final Office Action received for U.S. Appl. No. 14/548,389, dated May 15, 2018, 10 pages.
Non-Final Office Action received for U.S. Appl. No. 14/548,389, dated May 16, 2017, 14 pages.
Non-Final Office Action received for U.S. Appl. No. 14/548,397, dated Jul. 6, 2017, 15 pages.
Notice of Allowance received for U.S. Appl. No. 14/548,389, dated Sep. 17, 2018, 14 pages.
Notice of Allowance received for U.S. Appl. No. 14/548,397, dated Apr. 19, 2018, 13 pages.
"Outlook 2000 Handbook First Edition", last 9 lines, 2000, p. 95.
Pender, Lee, "Hard Times are the Best Times", Magazine, Cio, Available at: <www.cio.com/archive/081501/besttimes_content.html>, Aug. 15, 2001, pp. 3-7.
Raco Industries, "Increase Delivery Visibility And Simplify Your Process", Available at: <http://www.racointeractive.com/media/834/raco_interactive-pd.pdf>, Retrieved on Sep. 25, 2013, 2 pages.
Van Huzien, Gordon, "Messaging: The Transport Part of The XML Puzzle", IBM Developer Works, Article, Retrieved from: URL:http://www-106.ibm.com/developerworks/library/xml-messaging/>, Jul. 2000, 8 pages.
Non-Final Office Action received for U.S. Appl. No. 16/573,021, dated Feb. 1, 2021, 23 pages.
Final Office Action received for U.S. Appl. No. 16/573,021, dated Aug. 11, 2021, 30 pages.
Non-Final Office Action received for U.S. Appl. No. 16/573,021, dated Mar. 16, 2022, 37 pages.

* cited by examiner

CONCEPTS FOR ELECTRONIC DOOR HANGERS

CROSS-REFERENCE TO RELATED APPLICATIONS

This application is a continuation of U.S. Pat. No. 10,192,190, filed on 20 Nov. 2014 and entitled "Concepts for Electronic Door Hangers," which claims priority to U.S. Provisional Application No. 61/906,511, filed Nov. 20, 2013, each of which is hereby incorporated herein in its entirety by reference.

BACKGROUND

With the increasing demand of customer-focused pick-ups and deliveries of items, new technologies are needed for communicating relevant information to customers in a timely and easy to use manner.

BRIEF SUMMARY

In general, embodiments of the present invention provide methods, apparatus, systems, computing devices, computing entities, and/or the like for providing notifications using electronic door hangers.

In accordance with one aspect, a method is provided. In one embodiment, the method comprises (1) responsive to a connection button associated with a customer computing entity being activated, automatically establishing a connection between an electronic door hanger and the customer computing entity within a configurable time period; and (2) responsive to automatically establishing the connection between the electronic door hanger and the customer computing entity, automatically providing, via a user computing entity operated by a carrier operator at the customer's location, a notification regarding a pick-up or a delivery of an item to the customer computing entity.

In accordance with yet another aspect, a system comprising a user computing entity and an electronic door hanger is provided. In one embodiment, the system is configured to (1) responsive to a connection button associated with a customer computing entity being activated, automatically establish, via the electronic door hanger, a connection between an electronic door hanger and the customer computing entity within a configurable time period; and (2) responsive to automatically establishing the connection between the electronic door hanger and the customer computing entity, automatically provide, via the user computing entity operated by a carrier operator at the customer's location, a notification regarding a pick-up or a delivery of an item to the customer computing entity.

In accordance with one aspect, a method is provided. In one embodiment, the method comprises (1) monitoring a location of an electronic door hanger, a location of a customer computing entity, or both, wherein (a) a customer associated with the customer computing entity is registered for notification services and (b) the electronic door hanger is placed at the customer's location; (2) determining whether the electronic door hanger and the customer computing entity are within a configurable distance from each other; and (3) responsive to determining that the electronic door hanger and the customer computing entity are within the configurable distance from each other, automatically providing a notification regarding a pick-up or a delivery of an item to an electronic destination address associated with the customer's notification preferences.

In accordance with another aspect, a computer program product is provided. The computer program product may comprise at least one computer-readable storage medium having computer-readable program code portions stored therein, the computer-readable program code portions comprising executable portions configured to (1) monitor a location of an electronic door hanger, a location of a customer computing entity, or both, wherein (a) a customer associated with the customer computing entity is registered for notification services and (b) the electronic door hanger is placed at the customer's location; (2) determine whether the electronic door hanger and the customer computing entity are within a configurable distance from each other; and (3) responsive to determining that the electronic door hanger and the customer computing entity are within the configurable distance from each other, automatically provide a notification regarding a pick-up or a delivery of an item to an electronic destination address associated with the customer's notification preferences.

In accordance with yet another aspect, an apparatus comprising at least one processor and at least one memory including computer program code is provided. In one embodiment, the at least one memory and the computer program code may be configured to, with the processor, cause the apparatus to (1) monitor a location of an electronic door hanger, a location of a customer computing entity, or both, wherein (a) a customer associated with the customer computing entity is registered for notification services and (b) the electronic door hanger is placed at the customer's location; (2) determine whether the electronic door hanger and the customer computing entity are within a configurable distance from each other; and (3) responsive to determining that the electronic door hanger and the customer computing entity are within the configurable distance from each other, automatically provide a notification regarding a pick-up or a delivery of an item to an electronic destination address associated with the customer's notification preferences.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4A, 4B, 4C, 4D, 4E, 4F, and 4G are electronic door hangers according to one embodiment of the present invention.

Figure 5A:
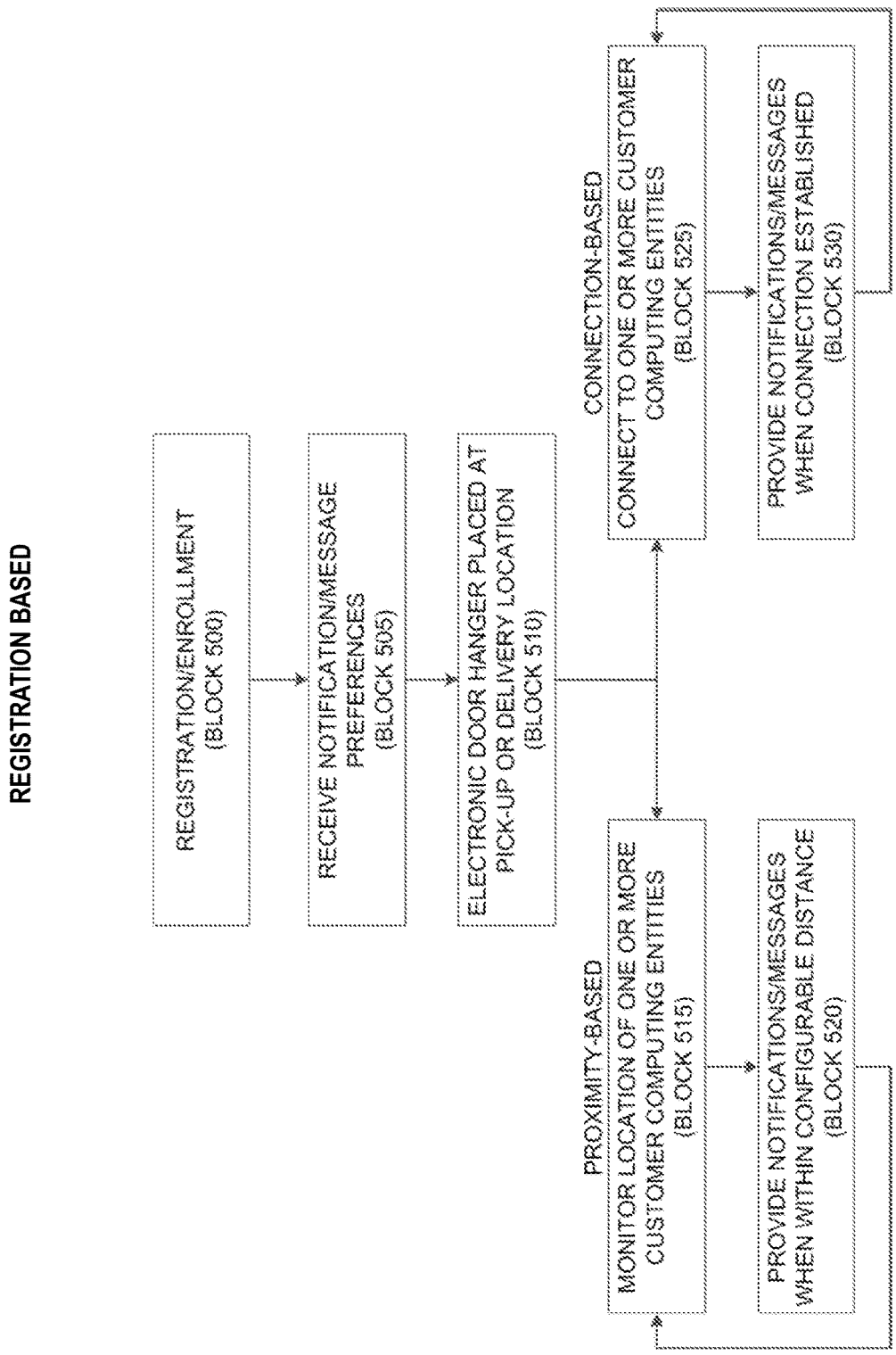
Figure 5B:
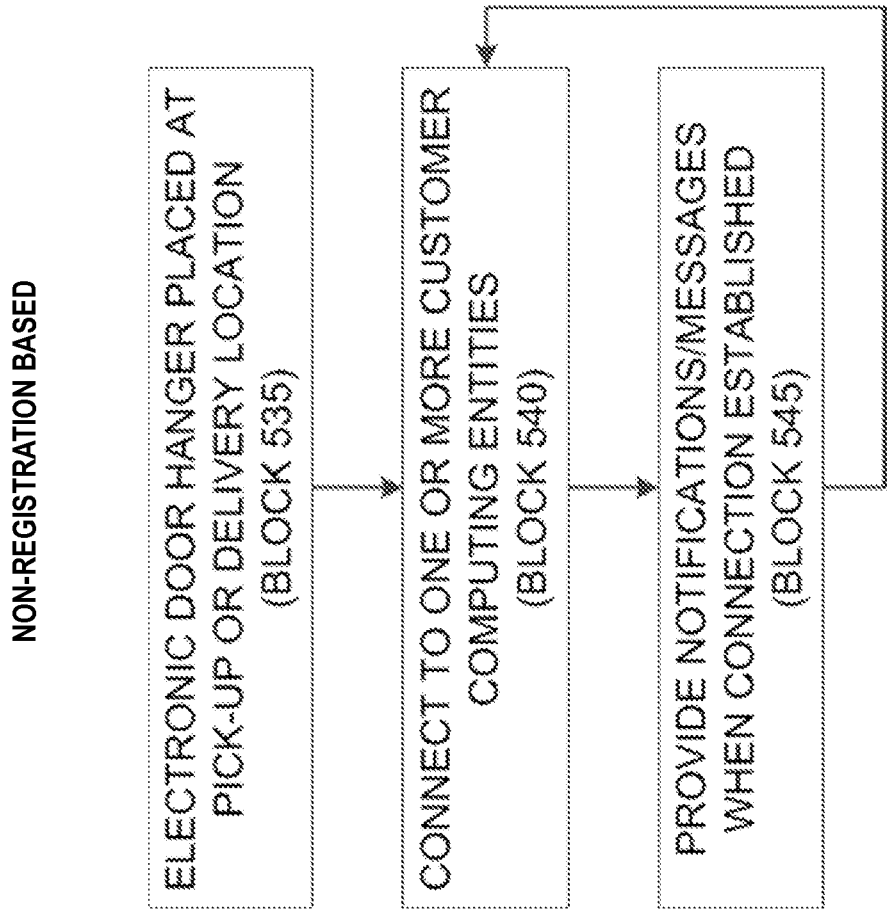

FIGS. 5A and 5B are flowcharts illustrating operations and processes that can be used in accordance with various embodiments of the present invention.

Figure 6:
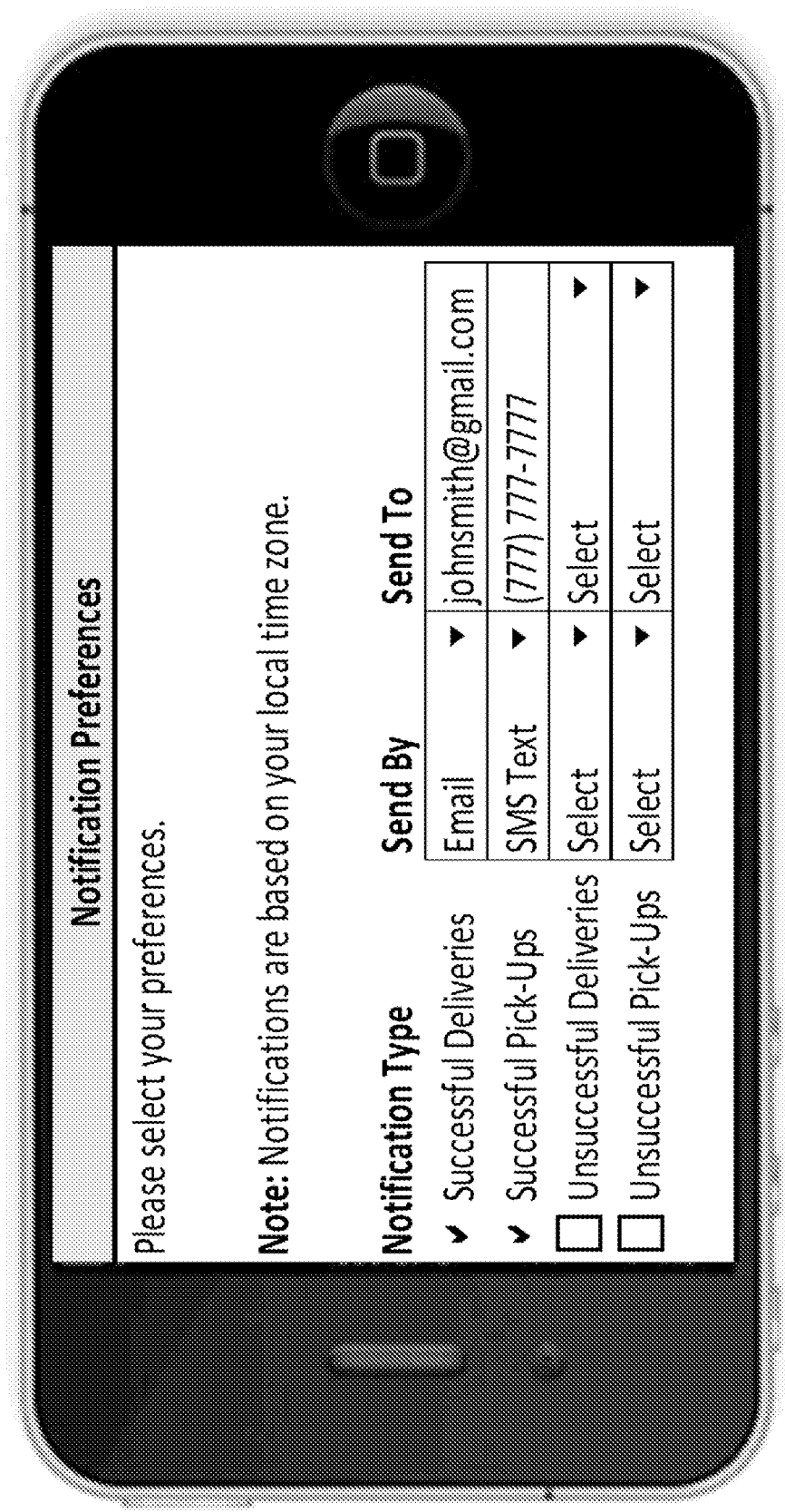
Figure 7:
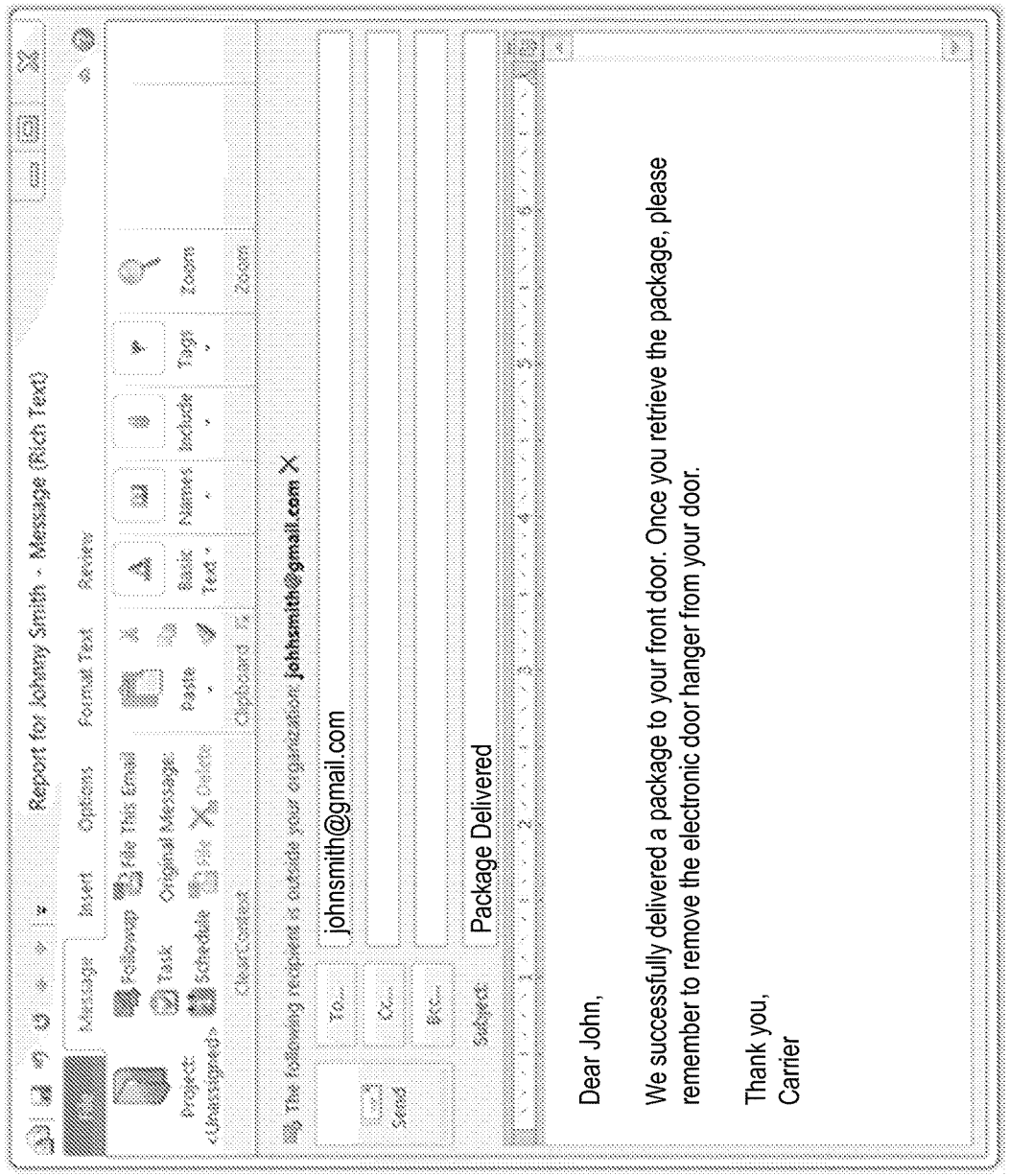
Figure 8:
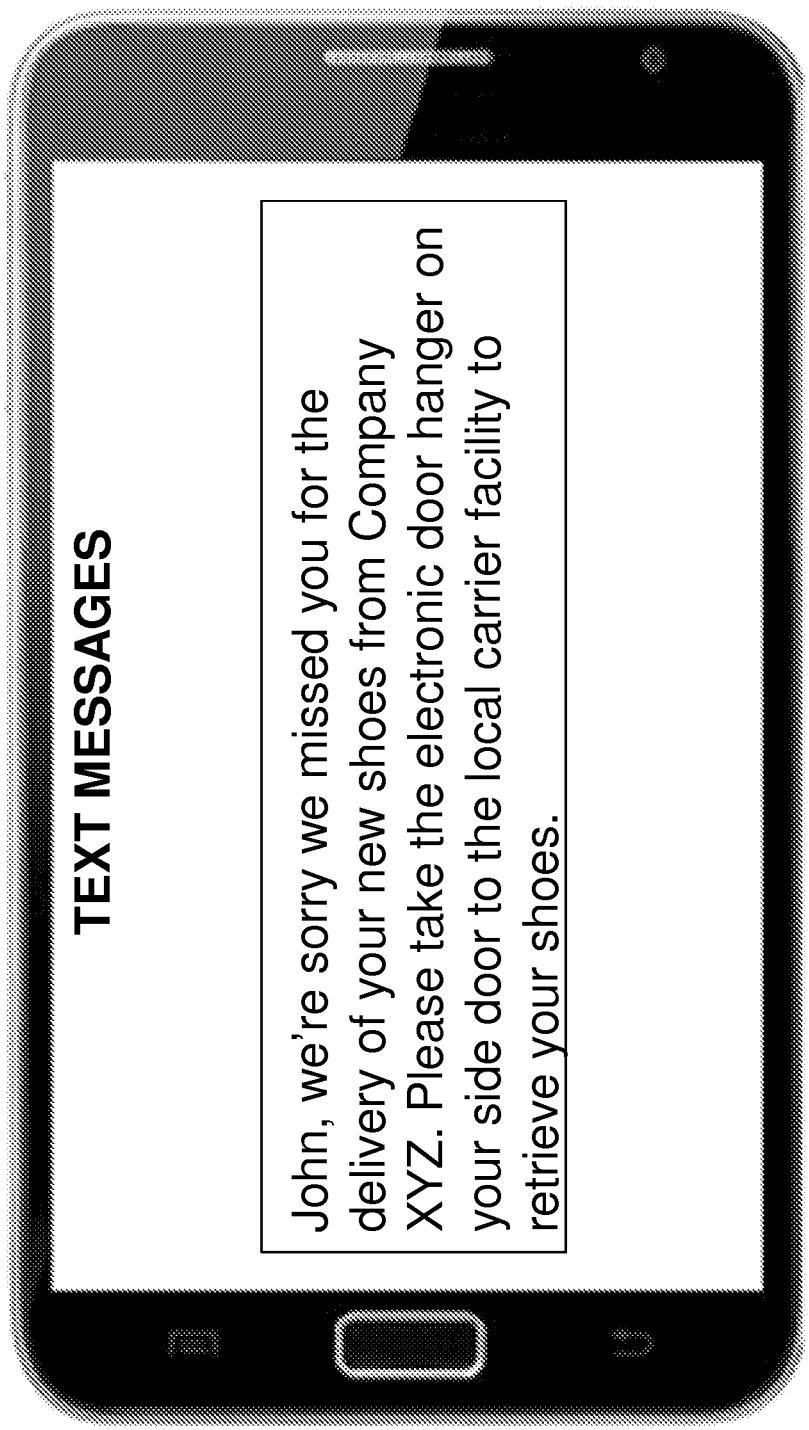

FIGS. 6-8 are exemplary input and output produced with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
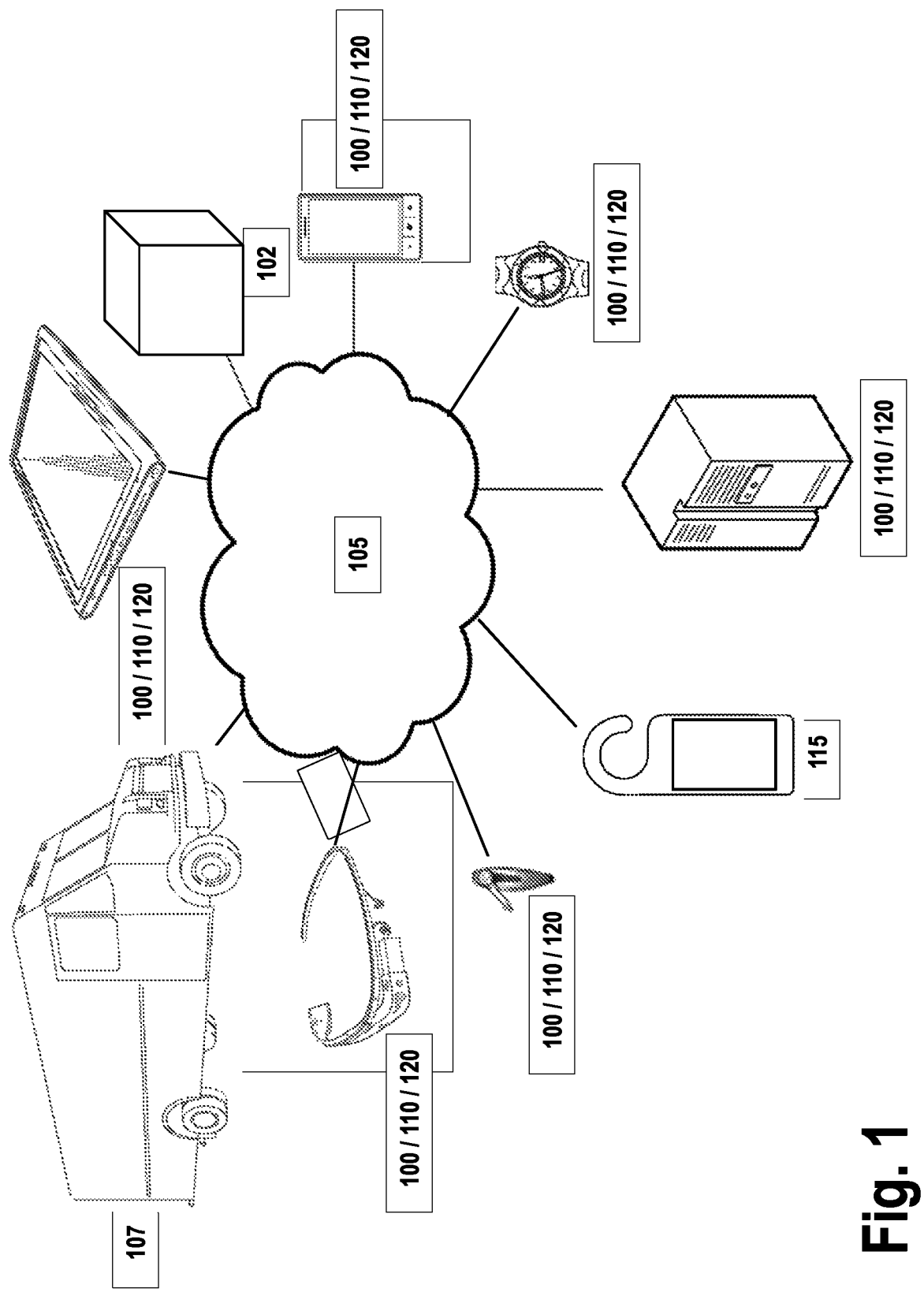
FIG. 1 is an overview of a system that can be used to practice embodiments of the present invention.

FIG. 1 provides an illustration of an exemplary embodiment of the present invention. As shown in FIG. 1, this particular embodiment may include one or more carrier/transporter computing entities 100, one or more items 102, one or more networks 105, one or more vehicles 107, one or more customer computing entities 110, one or more electronic door hangers 115, one or more user computing entities 120, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier/Transporter Computing Entity

Figure 2:
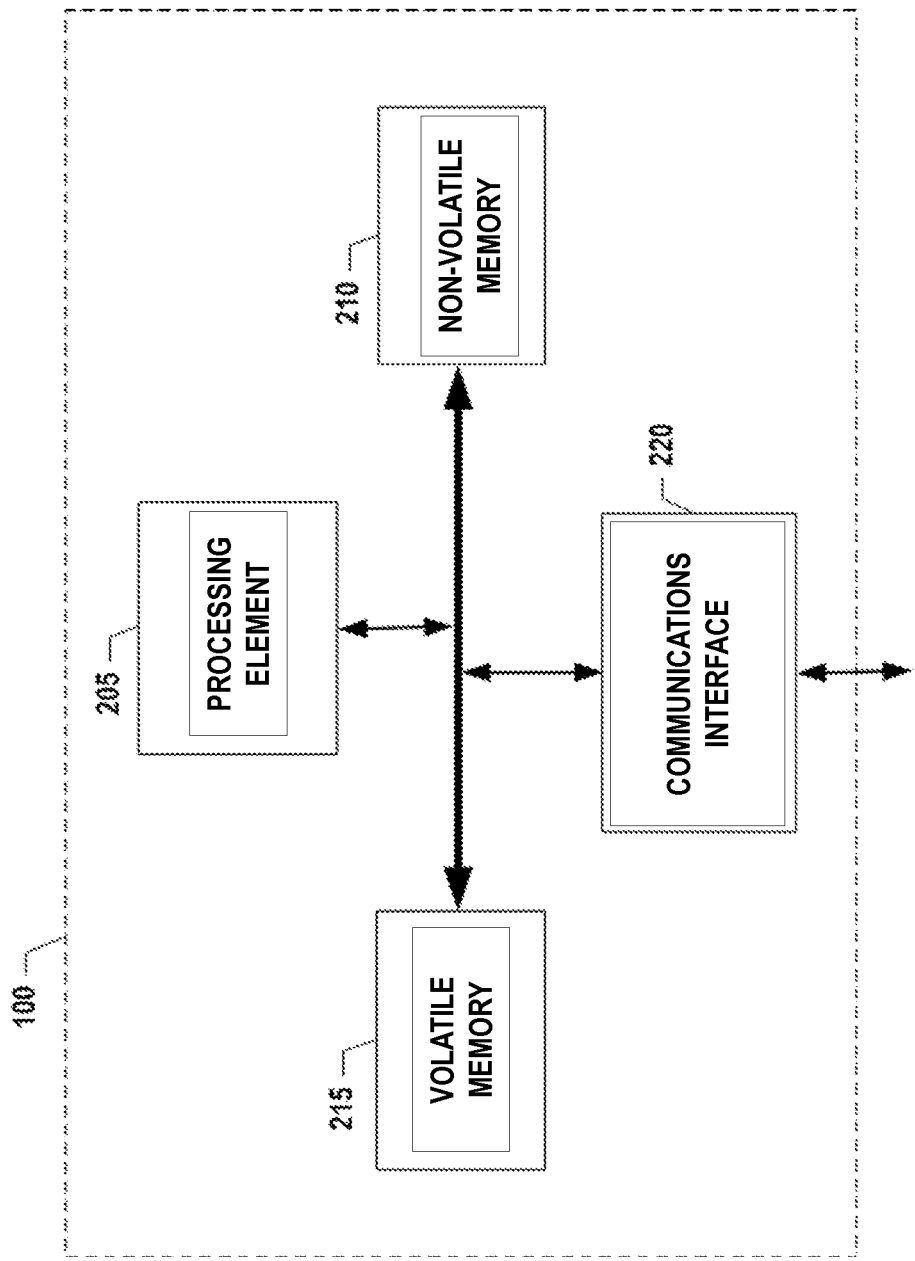
FIG. 2 is an exemplary schematic diagram of a carrier/transporter computing entity according to one embodiment of the present invention.

FIG. 2 provides a schematic of a carrier/transporter computing entity 100 according to one embodiment of the present invention. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the carrier/transporter computing entity 100 may communicate with customer computing entities 110, electronic door hangers 115, user computing entities 120, and/or the like.

As shown in FIG. 2, in one embodiment, the carrier/transporter computing entity 100 may include or be in communication with one or more processing elements 205 (also referred to as processors, processing circuitry, processing device, and/or similar terms used herein interchangeably) that communicate with other elements within the carrier/transporter computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application- specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier/transporter computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the carrier/transporter computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier/transporter computing entity 100 with the assistance of the processing element 205 and operating system.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier/transporter computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the carrier/transporter computing entity 100 may include or be in communication with one or more input elements, such as a keyboard input, a mouse input, a touch screen/display input, motion input, movement input, audio input, pointing device input, joystick input, keypad input, and/or the like. The carrier/transporter computing entity 100 may also include or be in communication with one or more output elements (not shown), such as audio output, video output, screen/display output, motion output, movement output, and/or the like. Further, an electronic door hanger 115 may have a locking/unlocking mechanism that can be activated/deactivated remotely or locally by a carrier/transporter computing entity 100, customer computing entity 110, and/or user computing entity 120.

As will be appreciated, one or more of the carrier/transporter computing entity's 100 components may be located remotely from other carrier/transporter computing entity 100 components, such as in a distributed system. Furthermore, one or more of the components may be combined and additional components performing functions described herein may be included in the carrier/transporter computing entity 100. Thus, the carrier/transporter computing entity 100 can be adapted to accommodate a variety of needs and circumstances. As will be recognized, these architectures and descriptions are provided for exemplary purposes only and are not limiting to the various embodiments.

2. Exemplary Vehicle

In various embodiments, the term vehicle 107 is used generically. For example, a carrier/transporter vehicle 107 may be a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an airplane, a helicopter, a boat, a barge, and/or any other form of object for moving or transporting people and/or items (e.g., one or more packages, parcels, bags, containers, loads, crates, items banded together, vehicle parts, pallets, drums, the like, and/or similar words used herein interchangeably). In one embodiment, each vehicle 107 may be associated with a unique vehicle identifier (such as a vehicle ID) that uniquely identifies the vehicle 107. The unique vehicle ID (e.g., trailer ID, tractor ID, vehicle ID, and/or the like) may include characters, such as numbers, letters, symbols, and/or the like. For example, an alphanumeric vehicle ID (e.g., "AS") may be associated with each vehicle 107. In another embodiment, the unique vehicle ID may be the license plate, registration number, or other identifying information assigned to the vehicle 107.

Various computing entities, devices, and/or similar words used herein interchangeably can be associated with the vehicle 107, such as a data collection device or other computing entities. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The data collection device may collect telematics data (including location data) and transmit/send the data to the mobile computing entity, the mapping computing entity, and/or various other computing entities via one of several communication methods.

In one embodiment, the data collection device may include, be associated with, or be in wired or wireless communication with one or more processors (various exemplary processors are described in greater detail below), one or more location-determining devices or one or more location sensors (e.g., Global Navigation Satellite System (GNSS) sensors), one or more telematics sensors, one or more real-time clocks, a J-Bus protocol architecture, one or more electronic control modules (ECM), one or more communication ports for receiving telematics data from various sensors (e.g., via a CAN-bus), one or more communication ports for transmitting/sending data, one or more RFID tags/sensors, one or more power sources, one or more data radios for communication with a variety of communication networks, one or more memory modules 410, and one or more programmable logic controllers (PLC). It should be noted that many of these components may be located in the vehicle 107 but external to the data collection device.

In one embodiment, the one or more location sensors, modules, or similar words used herein interchangeably may be one of several components in wired or wireless communication with or available to the data collection device. Moreover, the one or more location sensors may be compatible with GPS satellites, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 107 and/or the vehicle's operator and with various communication points (e.g., cellular towers or Wi-Fi access points) positioned at various locations throughout a geographic area to monitor the location of the vehicle 107 and/or its operator. The one or more location sensors may be used to receive latitude, longitude, altitude, heading or direction, geocode, course, position, time, and/or speed data (e.g., referred to herein as telematics data and further described herein below). The one or more location sensors may also communicate with the mapping computing entity, the data collection device, mobile computing entity, and/or similar computing entities.

As indicated, in addition to the one or more location sensors, the data collection device may include and/or be associated with one or more telematics sensors, modules, and/or similar words used herein interchangeably. For example, the telematics sensors may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., referred to herein as telematics data). The telematics sensors may include environmental sensors, such as air quality sensors, temperature sensors, and/or the like. Thus, the telematics data may also include carbon monoxide (CO), nitrogen oxides (NOx), sulfur oxides (SOx), Ethylene Oxide (EtO), ozone (O3), hydrogen sulfide (H2S) and/or ammonium (NH4) data, and/or meteorological data (e.g., referred to herein as telematics data).

In one embodiment, the ECM may be one of several components in communication with and/or available to the data collection device. The ECM, which may be a scalable and subservient device to the data collection device, may have data processing capability to decode and store analog and digital inputs from vehicle systems and sensors. The ECM may further have data processing capability to collect and present telematics data to the J-Bus (which may allow transmission to the data collection device), and output standard vehicle diagnostic codes when received from a vehicle's J-Bus-compatible on-board controllers 440 and/or sensors. As indicated, a communication port may be one of several components available in the data collection device (or be in or as a separate computing entity). Embodiments of the communication port may include an Infrared data Association (IrDA) communication port, a data radio, and/or a serial port. The communication port may receive instructions for the data collection device. These instructions may be specific to the vehicle 107 in which the data collection device is installed, specific to the geographic area in which the vehicle 107 will be traveling, specific to the function the vehicle 107 serves within a fleet, and/or the like. In one embodiment, the data radio may be configured to communicate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the customer computing entity 110 may operate in accordance with multiple wired communication standards and protocols, such as those described above with regard to the carrier/transporter computing entity 100 via a network interface 320.

3. Exemplary Item

An item/shipment 102 may be any tangible and/or physical object. Such items/shipments 102 may be picked up and/or delivered by a carrier/transporter. In one embodiment, an item/shipment 102 may be or be enclosed in one or more packages, parcels, bags, containers, loads, crates, items banded together, vehicle parts, pallets, drums, the like, and/or similar words used herein interchangeably. Such items 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. Further, such items 102 may have the capabilities and components of the described with regard to the carrier/transporter computing entities 100, networks 105, vehicles 107, customer computing entities 110, electronic door hangers 115, user computing entities 120, and/or the like. In this regard, in some example embodiments, an item may communicate send "to" address information/data, received "from" address information/data, unique identifier codes, and/or various other information/data. In one embodiment, each item may include an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein.

4. Exemplary Customer Computing Entity

Figure 3:
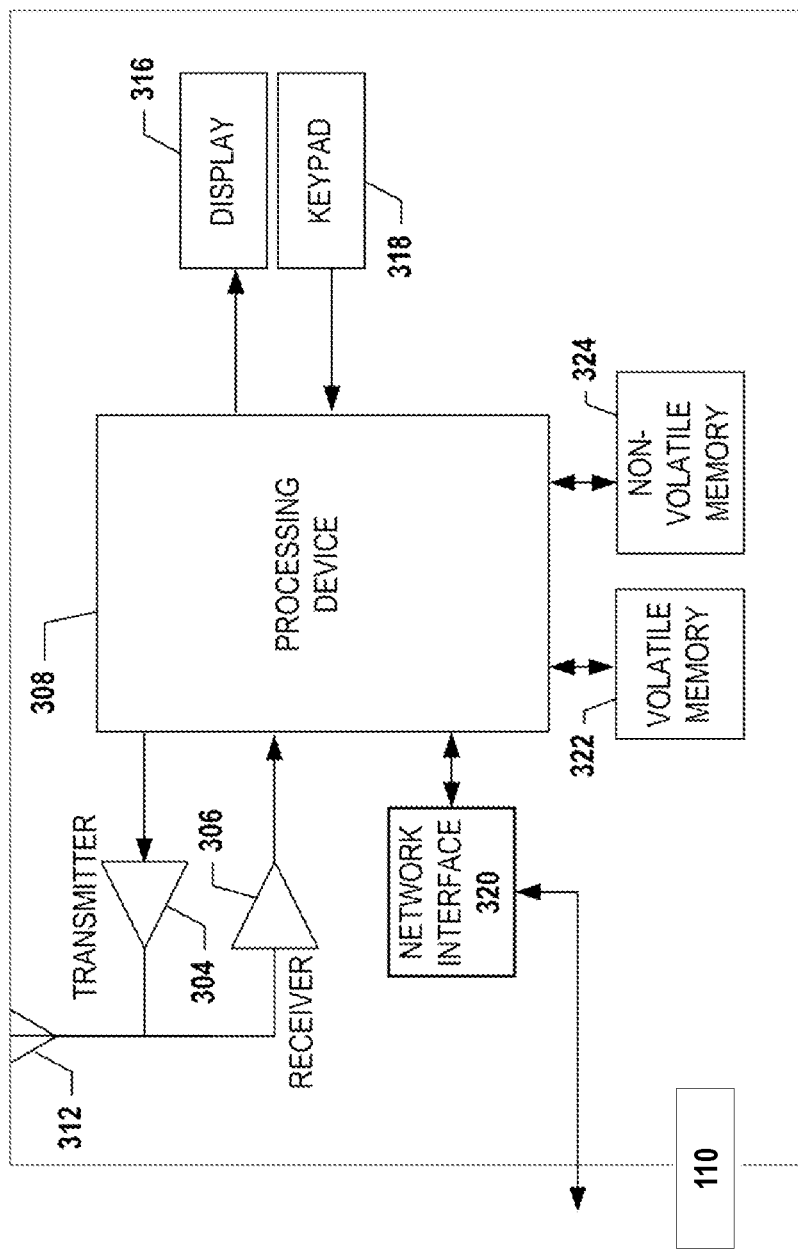
FIG. 3 is an exemplary schematic diagram of a customer computing entity according to one embodiment of the present invention.
Figure 4C:
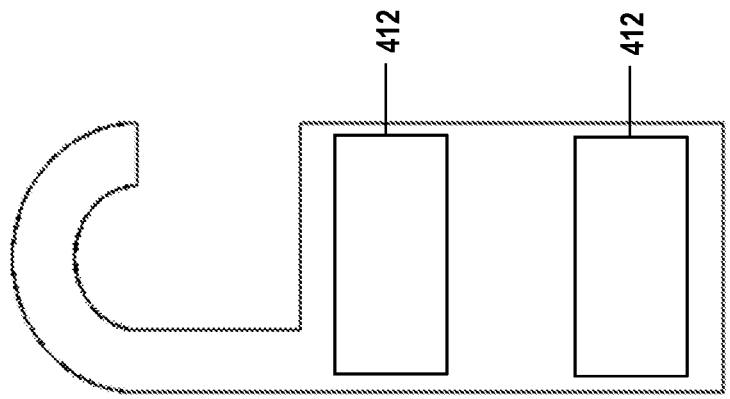
Figure 4B:
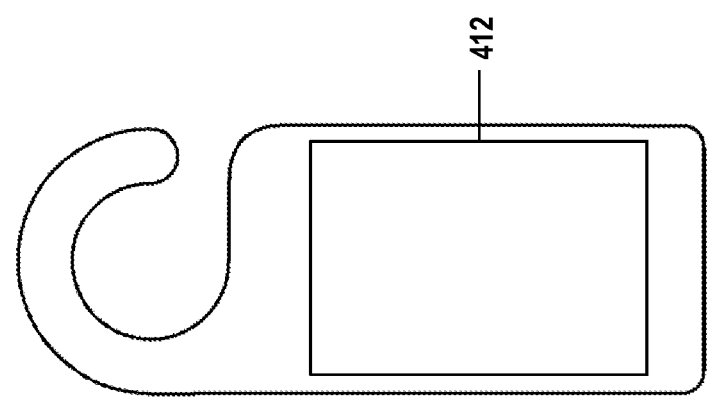
Figure 4A:
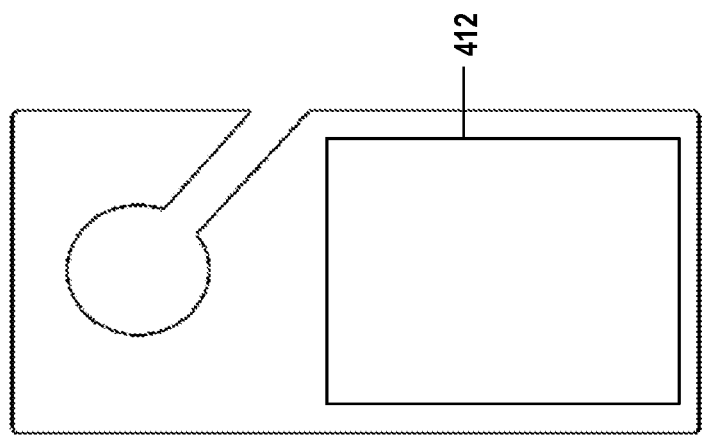
Figure 4F:
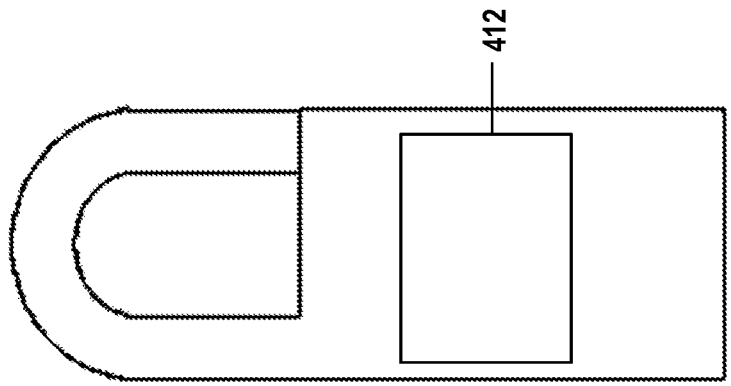
Figure 4E:
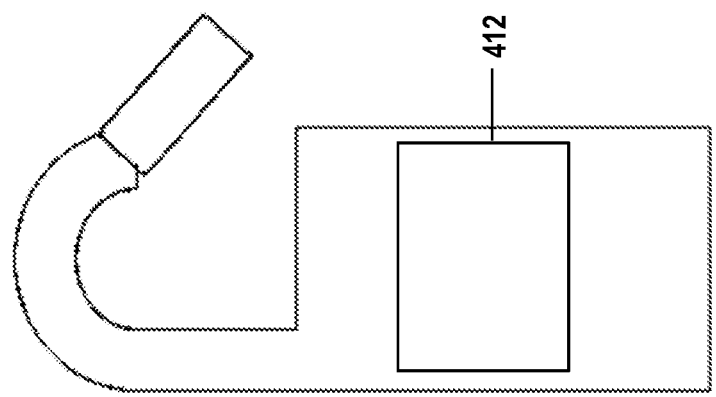
Figure 4D:
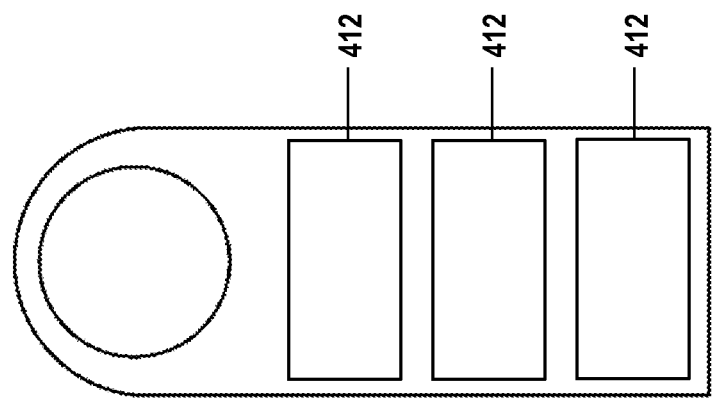
Figure 4G:
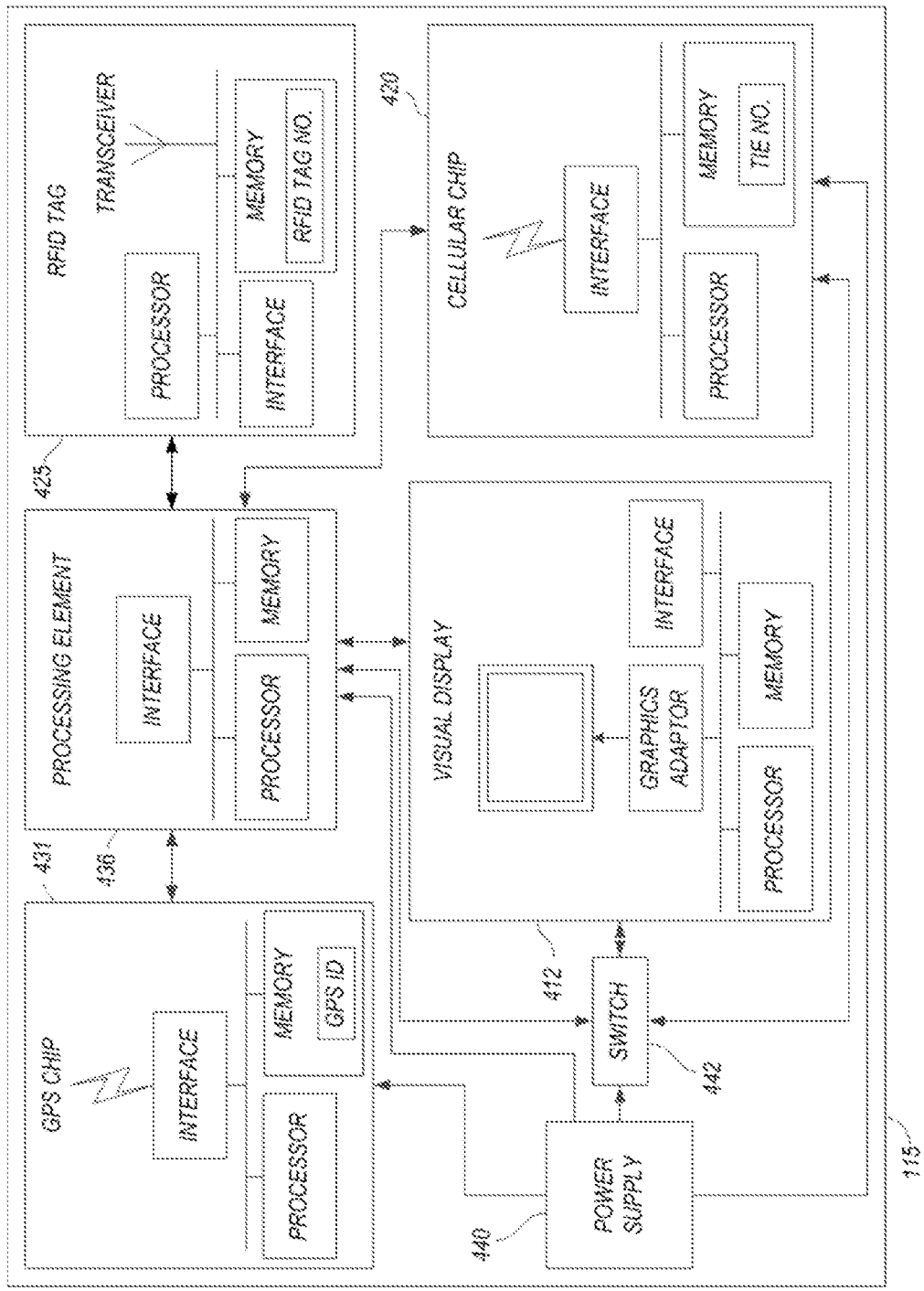

FIG. 3 provides an illustrative schematic representative of a customer computing entity 110 that can be used in conjunction with embodiments of the present invention. In one embodiment, a customer may be a consignor (person sending an item/shipment 102) or a consignee (intended recipient of an item/shipment 102). In one embodiment, a customer computing entity 110 may include one or more components that are functionally similar to those of the carrier/transporter computing entity 100, item 102, vehicle 107, electronic door hanger 115, user computing entity 120, and/or the like. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the customer computing entity 110 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the customer computing entity 110 may be capable of operating with one or more air interface standards, communication protocols, modulation types, and access types. More particularly, the customer computing entity 110 may operate in accordance with any of a number of wireless communication standards and protocols, such as those described above with regard to the carrier/transporter computing entity 100. In a particular embodiment, the customer computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the customer computing entity 110 may operate in accordance with multiple wired communication standards and protocols, such as those described above with regard to the carrier/transporter computing entity 100 via a network interface 320.

Via these communication standards and protocols, the customer computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system.

According to one embodiment, the customer computing entity 110 may include a location determining aspects, device, module, functionality, and/or similar words used herein interchangeably. For example, the customer computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using GPS). The satellites may be a variety of different satellites, including LEO satellite systems, DOD satellite systems, the European Union Galileo positioning systems, the Chinese Compass navigation systems, Indian Regional Navigational satellite systems, and/or the like. This data can be collected using a variety of coordinate systems, such as the DD; DMS; UTM; UPS coordinate systems; and/or the like. Alternatively, the location information can be determined/identified by triangulating the customer computing entity's 110 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The customer computing entity 110 may also comprise a user interface (that can include a display 316 coupled to a processing element 308) and/or a user input interface (coupled to a processing element f). For example, the user interface may be a user application, browser, user interface, and/or similar words used herein interchangeably executing on and/or accessible via the customer computing entity 110 to interact with and/or cause display of information from the carrier/transporter computing entity 100, as described herein. The user input interface can comprise any of a number of devices allowing the customer computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The customer computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the customer computing entity 110. As indicated, this may include a user application that is resident on the entity or accessible through a browser or other user interface for communicating with the carrier/transporter computing entity 100, electronic door hanger 115, and/or various other computing entities.

In another embodiment, the customer computing entity 110 may include one or more components or functionality that are the same or similar to those of the carrier/transporter computing entity 100, as described in greater detail above. As will be recognized, these architectures and descriptions are provided for exemplary purposes only and are not limiting to the various embodiments.

In one embodiment, customer computing entities 110 may be fixed with regard to their geographic locations, such as by being in fixed positions at school entrances, bus stops, mall entrances, aisles of a store, in classrooms, on playgrounds, at intersections, on light poles, in cafeterias or hallways, on bridges, and/or the like. In another embodiment, customer computing entities 110 may be mobile with regard to their geographic locations. For example, one or more of the customer computing entities 110 may be disposed on school buses, worn by school bus drivers, be attached to package delivery vehicles, attached to mobile shipping containers, affixed to shopping carts or wheelchairs, positioned in passenger vehicles, and/or the like. As will be recognized, electronic door hangers 115 may also be mobile with regard to their geographic locations by being carried or worn by the respective users, attached to vehicles, and/or the like. As will be recognized, a variety of other approaches and techniques can be used to adapt to various needs and circumstances.

5. Exemplary Electronic Door Hanger

FIGS. 4A-4G represent exemplary depictions of components of an electronic door hanger 115. In one embodiment, an electronic door hanger 115 can be sized and shaped to hang on or around a variety of objects including door knobs, door locks, door levers, other door hardware, posts, fences, mailboxes, lights, and/or the like. FIGS. 4A-4F show particular embodiments in which electronic door hangers 115 are appropriately sized and shaped by molding plastic to hang on or around various objects. The electronic door hangers 115 can be created or molded from one or more plastics, such as Polyethylene Terephthalate (PET or PETE), High Density Polyethylene (HDPE), Plastic Polyvinyl Chloride (PVC), Low Density Polyethylene (LDPE), Polypropylene (PP), Polystyrene (PS), and/or the like. As will be recognized, the electronic door hanger 115 can also include or be made of a variety of other materials as well. In one embodiment, an electronic door hanger 115 (not shown) may also include a pouch that can hold or store various papers (e.g., invoices, receipts, advertisements, and/or the like) and/or comprise one or more labels.

In some embodiments, components of an electronic door hanger 115 may include one or more display areas/portions 412, one or more processing elements 436, one or more location determining aspects 431 (such as those described previously), one or more RFID tags 425, one or more power supplies 440, one or more power switches 442, one or more communications interfaces 420, and/or the like. A communications interface 420 may be a long range (e.g., radio transceiver) or short range (e.g., RFID tag, NFC) communications interface. A communications interface 420 may be capable of communicating in one or more cellular communications protocols, including, but not limited to, UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. The communications interface 420 may allow the electronic door hanger to communicate with carrier/transporter computing entities 100, customer computing entities 110, user computing entities 120, and/or the like. In certain embodiments, this may allow a carrier/transporter computing entity 100 (or other computing entity) to remotely wipe (e.g., delete) any information/data from the electronic door hanger 115. This may also allow the electronic door hanger 115 to establish connections and communicate with customer computing entities 110.

A communications interface 420 may be connected to a processing element 436 to transmit shipping information/data to the processing element 436 so that the information/data may be translated into a format that may be capable of being displayed on a display area/portion 412. A display area/portion 412 may be connected to a processing element 436 so that the display area/portion 412 may receive shipping information/data that is to be displayed. A display area/portion 412 may refer to any type of updateable electronic display, whether black and white or color, such as Gyricon, electrophoretic display, electrowetting display, Light-emitting diode (LED) display, liquid crystal display (LCD), bistable LCD, electronic paper display, or any similar type of updateable electronic display. A display area/portion 412 may further include displays such as electrochromic displays, printed electronic displays, or displays manufactured using organic electronics or plastics electronics and using materials such as conductive polymers, plastics, and small molecules.

A power supply 440 may be one of many types of power supplies, including a battery, a power sheet, photoelectric cell, and the like. Such power supplies 440 may be lightweight, flexible, and ultra-thin. Nevertheless, power supplies that are not lightweight, flexible, and/or ultra-thin may also be utilized in an electronic door hanger 115.

A power switch 442 may be any switch that may change the flow of the current or voltage applied by a power supply 440 to a display area/portion 412. A power switch 442 may be selectively activated by a processing element 436 in order to provide power to illuminate a display area/portion 412. As will be recognized, a variety of other approaches and techniques can be used to adapt to various needs and circumstances.

An electronic door hanger 115 may have a variety of other features and functionality, including those described in U.S. Pat. No. 7,511,617 and U.S. Publ. No. 2009-0319078, which are hereby incorporated herein in their entireties by reference.

6. Exemplary User Computing Entity

In one embodiment, a user computing entity 120 may be operated by carrier/transporter personnel/operator (e.g., picking up and/or delivering items to customers). In one embodiment, a user computing entity 120 may include one or more components that are functionally similar to those of the carrier/transporter computing entity 100, the customer computing entity 110, the electronic door hanger 115, and/or the like. For example, in one embodiment, each user computing entity 120 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, interface, and/or similar words used herein interchangeably executing on and/or accessible via the user computing entity 120 to interact with and/or cause display of information, as described herein. This may also enable the user computing entity 120 to communicate with various other computing entities, such as carrier/transporter computing entities, customer computing entities 110, electronic door hangers 115, and/or various other computing entities. As will be recognized, these architectures and descriptions are provided for exemplary purposes only and are not limiting to the various embodiments.

III. EXEMPLARY SYSTEM OPERATION

Reference will now be made to FIGS. 4A, 4B, 4C, 4D, 4E, 4F, 4G, and 5-8. FIGS. 4A, 4B, 4C, 4D, 4E, 4F, and 4G are electronic door hangers according to one embodiment of the present invention. FIGS. 5A and 5B are flowcharts illustrating operations and processes that can be used in accordance with various embodiments of the present invention. And FIGS. 6-8 are exemplary input and output produced with various embodiments of the present invention.

1. Registration

In one embodiment, as indicated in Block 500 of FIG. 5A, the process may begin with the enrollment/registration of one or more customers for an account, subscription, program, and/or similar words used herein interchangeably for notification/message services (e.g., as par to a pick-up and/or delivery program). As previously noted, a customer may be an individual, a family, a family member, a company, an organization, an entity, a department within an organization, a representative of an organization and/or person, and/or the like. To register, a customer (e.g., a customer or customer representative operating a customer computing entity 110) may access a webpage, application, dashboard, browser, or portal of an entity that provides notification/ message services. As will be recognized, a variety of entities can provide notification/message services to adapt to various needs and circumstances.

In one embodiment, as part of the enrollment/registration process, a customer (e.g., a customer or customer representative operating a customer computing entity 110) may be requested to provide information/data (e.g., including customer information/data, biographic information/data, geographic information/data, device or entity information/data, payment information/data, and/or the like) by the carrier/transporter computing entity 100 (e.g., via the registration module). The information/data may be manually input by a customer; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include the customer's name, such as a first name, a last name, a company name, an entity name, an organization name, and/or the like. The geographic information/data may also include one or more physical addresses associated with the customer (e.g., street address, city, state, postal code, and/or country). The physical addresses may be residential or commercial addresses, geocodes, latitude and longitude points, virtual addresses, and/or the like.

In one embodiment, the customer information/data may include one or more communication formats for communicating with the customer. The communication formats may include text messages (e.g., SMS, MMS), email messages, voice messages, video messages (e.g., YouTube, the Vine), picture messages (e.g., Instagram), social media messages (e.g., private social media created internally for entities, business social media (e.g., Yammer, SocialCast), or public social media (e.g., Facebook, Instagram, Twitter)), digital assistants message (e.g., Google Now, Ski), and/or a variety of other messages in various communication formats. In addition to the one or more communication formats, the customer (e.g., operating a customer computing entity 110) can provide the corresponding electronic destination addresses to be used in providing information/data associated with the notification/message services to the customer (e.g., email addresses, online handles, phone numbers, customer names, etc.). For instance, for text messages, the customer may provide one or more cellular phone numbers. For email messages, the customer may provide one or more email addresses. And for voice messages, the customer may provide one or more cellular or landline phone numbers or other electronic destination addresses to which audio files can be delivered. Additionally, in one embodiment, validation operations can be performed with respect to each input electronic destination address—to ensure accuracy. As will be recognized, a variety of other types of electronic destination addresses can be used to adapt to various needs and circumstances.

As will be recognized, the notification/message services may be provided as a free service or as a paid service or as part of another program. In certain embodiments, the customer (e.g., a customer or customer representative operating a customer computing entity 110) may be requested to provide payment information/data. Payments (e.g., the payment information/data) may be in a variety of forms, such as via debit cards, credit cards, direct credits, direct debits, cash, check, money order, Internet banking, e-commerce payment networks/systems (e.g., PayPal™ Google Wallet, Amazon Payments), virtual currencies (e.g., Bitcoins), award or reward points, and/or the like. Such payments may be made using a variety of techniques and approaches, including through NFC technologies such as PayPass, Android Beam, S Beam, BLE, and various other contactless payment systems. Further, such payment technologies may include PayPal Beacon, Booker, Erply, Leaf, Leapset, Micros, PayPal Here, Revel, ShopKeep, TouchBistro, Vend, and/or the like.

In one embodiment, device or entity information/data may also be received, provided, detected, assigned, collected, requested, and/or similar words used herein interchangeably as part of the registration/enrollment process. As will be recognized, device or entity information/data may be collected for any number of devices or entities for association with a customer's account, subscription, program, and/or similar words used herein interchangeably for notification/message services. The device or entity information/data may include one or more entity or device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, customer names, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The device or entity information/data may include a device's vendor, model, specification authority, version, components, software specification and/or version, person associated with the device, and/or the like. The device or entity information/data may be used to track, monitor, connect with, communicate with, and/or the like the corresponding devices or entities. As will be recognized, a variety of other approaches and techniques can be used to adapt to various needs and circumstances.

In one embodiment, with the appropriate information/data, the carrier/transporter computing entity 100 may create a customer profile for the customer via the enrollment/registration process. Accordingly, the carrier/transporter computing entity 100 may create, store, and/or have access to various customer profiles and/or information/data associated with the customer profiles. In addition to at least the information/data described above, a customer profile may include one or more corresponding customer names, personal identification numbers (PINs), passwords, images, tokens, keys, passcodes, challenge phrases, reminders, and/or the like (referred to herein as credentials) for accessing accounts, applications, services, entities, notifications/messages, and/or the like.

In one embodiment, once a customer profile has been created by the carrier/transporter computing entity 100, the customer (e.g., operating a customer computing entity 110) can provide various preferences related to the notification/message services and/or have access to notification/message services (Block 505 of FIG. 5A). For instance, the customer (e.g., operating a customer computing entity 110) can provide a variety of preferences, including notification/message preferences regarding various events of interest. By way of example, the customer (e.g., a customer or customer representative operating a customer computing entity 110) may select, define, or otherwise configure the notifications/messages he or she wishes to receive based at least in part on events of interest. For example, as shown in FIG. 6, the customer (e.g., operating a customer computing entity 110)

may select to receive notification/message services about successful or unsuccessful deliveries and/or pick-ups.

Although certain embodiments include using a registration-based approached, non-registration-based approaches are contemplated within the scope of the various embodiments and are also described herein. Thus, as will be recognized, embodiments of the present invention can be modified to adapt to a variety of needs and circumstances.

2. Notification/Message Services

In one embodiment, an appropriate computing entity (e.g., carrier/transporter computing entity 100, item 102, vehicle 107, electronic door hanger 115, user computing entity 120, and/or the like) can automatically provide (e.g., generate, queue, and/or transmit) one or more notifications/messages in compliance with users' notification/message preferences for events of interest (e.g., successful or unsuccessful deliveries and/or pick-ups and/or the like). Similarly, an appropriate computing entity (e.g., carrier/transporter computing entity 100, item 102, vehicle 107, electronic door hanger 115, user computing entity 120, and/or the like) can automatically provide the one or more notifications/messages to the electronic destination addresses in compliance with users' notification/message preferences. For example, an appropriate computing entity (e.g., carrier/transporter computing entity 100, item 102, vehicle 107, electronic door hanger 115, user computing entity 120, and/or the like) can generate, queue, and/or transmit an email message to a user's email address, a text message to a user's cellular phone, a notification/message to a designated application, and/or the like for various events of interest (e.g., successful or unsuccessful deliveries and/or pick-ups and/or the like) as defined in the user notification/message preferences.

In another embodiment, an appropriate computing entity (e.g., electronic door hanger 115, and/or the like) can broadcast information/data indicating that one or more notifications/messages are available to the customer (e.g., consignor, consignee) with the corresponding credentials (e.g., customer names, PINs) passwords, keys, passcodes, images, tokens, challenge phrases, reminders, and/or the like). For instance, if a customer is not registered, an electronic door hanger 115 can broadcast information/data regarding the pick-up or delivery.

To receive such notification/message services, one or more customer computing entities 110 may be fixed or mobile with regard to their geographic locations. In one embodiment, customer computing entities 110 may be fixed with regard to their geographic locations (e.g., desktop computers, televisions, routers, and/or the like), such as by being in fixed positions at residential or commercial locations. Similarly, customer computing entities 110 may be mobile (e.g., smartphones, watches, and/or the like) with regard to their geographic locations. As will be recognized, electronic door hangers 115 may also be mobile with regard to their geographic locations by being carried to and placed on doors, for instance, at customer locations. As will be recognized, a variety of other approaches and techniques can be used to adapt to various needs and circumstances.

a. Item/Shipment Information/Data for Pick-Up and/or Delivery

In one embodiment, when an item/shipment 102 is to be picked up and/or delivered by the carrier/transporter using the carrier's transportation and logistics network, the item/shipment 102 may be associated with item/shipment information/data. The item/shipment information/data may comprise or be associated with input information/data, intermediate information/data, pick-up information/data, delivery information/data, exception information/data, tracking information/data, item-level information/data, consignor information/data, consignee information/data, name information/data, address information/data, billing information/data, and/or similar words used herein interchangeably.

In one embodiment, this information/data may comprise details about the item/shipment 102 itself, such as the length, width, base, radius, height, cube/volume (e.g., cubic feet, cubic centimeters, etc.), and/or weight (e.g., pounds, grams, etc.). The information/data may also include information/data about the type of or contents of the item/shipment 102, such as being of a special handling category. Such information/data may be obtained from a scan or other inspection of the item/shipment 102, including the scanning of a unique item/shipment identifier on the item/shipment 102 which refers to additional information/data about the item/shipment 102. Similarly, the information/data may be captured when the item/shipment 102 is first received by the carrier/transporter (e.g., receiving an item for ingestion into the transportation and logistics network), from a user generating a label or unique identifier, automatic detection using various systems, manually input information/data, and/or the like.

In one embodiment, the information/data may comprise details about the service level. Exemplary services levels may include Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. As will be recognized, various other services levels are contemplated within embodiments of the present invention.

In one embodiment, the information/data may include address information/data, consignor information/data, consignee information/data, and/or name information/data. The address information/data may comprise the address of the consignor and/or consignee that can be parsed by an appropriate computing entity (e.g., carrier/transporter computing entity 100, customer computing entity 110, payment computing entity 115, external information/data source computing entity 120, and/or the like). The consignee information/data, consignor information/data, and/or name information/data for a person may include a title, a given name, a surname, a suffix, a nickname, and/or the like. The consignee information/data, consignor information/data, and/or name information/data for an entity may include an entity name, entity designation, and/or the like. As will be recognized, a variety of other approaches and techniques can be used to adapt to various needs and circumstances.

As previously indicated, the information/data may also include tracking information/data (of various "tracking events") corresponding to the location of the item/shipment 102 in the transportation and logistics network as indicated by the tracking events, including one or more origin entity and destination entity pairs. To reflect the item's movement, an item/shipment identifier associated with the item/shipment 102 may, for example, be scanned or otherwise electronically read at various points as the item/shipment 102 is transported through the carrier's transportation and logistics network (include successful or unsuccessful pick-ups or deliveries). As indicated, these events may be referred to as tracking events. For the tracking events, an item/shipment identifier may be automatically scanned by a barcode or MaxiCode device, an RFID interrogator, a camera controller, a carrier/transporter employee using a customer computing entity 110, and/or the like. In one embodiment, each time an item/shipment identifier is scanned or read, an appropriate device/entity can generate information/data associated with the tracking event and transmit the appropriate information/data (e.g., item/shipment identifier, location and time of the scan or reading, event type, bundle/container, and/or the like) to the carrier/transporter computing entity 100 for storage in the item/shipment database. That is, during the item's transit from an origin to a delivery location, intermediate information/data and other information/data from tracking events may be obtained at various waypoints for storage.

In one embodiment, the tracking information/data may include exception information/data and/or delivery information/data. For instance, if there is a problem or exception to the normal handling procedures for an item/shipment 102, exception information/data may be obtained and stored. Exception information/data may indicate when and why a particular item/shipment 102 was not deliverable (e.g., incorrect primary address information/data, missing secondary information/data, consignee/consignor moved, and/or the like). Delivery information/data may include information/data obtained about an item/shipment 102 when it is delivered to the consignee, locker, delivery location, and/or the like. For example, a delivery scan may be accomplished by the person or driver (e.g., carrier/transporter personnel/operator) making the delivery via a customer computing entity 110 to record delivery information/data, such as the date, time, location, consignee identity, consignee signature, delivery location, and other information/data related to the delivery. As will be recognized, a variety of other approaches and techniques can be used to adapt to various needs and circumstances.

b. Pick-Ups and/or Deliveries

In one embodiment, carrier/transporter personnel/operator for the carrier/transporter can visit customer locations (e.g., consignor locations and/or consignee locations) to pick-up and/or deliver items/shipments that will be or have been transported through the carrier's transportation and logistics network. For instance, upon arriving at a pick-up location for an item/shipment 102, carrier/transporter personnel/operator can access or input item/shipment information/data for an item/shipment 102. Similarly, upon arriving at a delivery location for an item/shipment 102 to a consignee, carrier/transporter personnel/operator can access item/shipment information/data for the item/shipment 102 that includes the consignee's name and delivery location via a user computing entity 120. The corresponding item/shipment information/data can be displayed by the user computing entity 120 for viewing by carrier/transporter personnel/operator.

In the event an item/shipment 102 is successfully picked up or delivered based on the provided item/shipment information/data, carrier/transporter personnel/operator can input a corresponding entry (e.g., via a customer computing entity 110) indicating when, where, and/or from or to whom the item/shipment 102 was picked up or delivered—which can then be provided by carrier/transporter personnel/operator (e.g., operating user computing entities 120) to a variety of computing entities for storage as item/shipment information/data. Then, an appropriate computing (e.g., carrier/transporter computing entity 100 or a user computing entity 120 operated by carrier/transporter personnel/operator) can provide item/shipment information/data to an electronic door hanger 115 using any of a variety of communication protocols at the pick-up or delivery location. Thus, the item/shipment information/data provided and received by the electronic door hanger 115 may include the what, when, where, and/or from or to whom the item/shipment 102 was picked up or delivered. The electronic door hanger 115 may also be provided and receive information/data associated with the corresponding customer's profiles, such as device or entity information/data and/or credentials that may allow registered customers to access the information/data stored by the electronic door hanger 115. With such information/data, carrier/transporter personnel/operator can leave the electronic door hanger 115 at the pick-up or delivery location to be discovered locally or remotely by one or more customer computing entities 110 (Block 510 of FIG. 5A). The electronic door hanger 115 can communicate/transmit and/or display (e.g., via the display area/portion) the item/shipment information/data.

Similarly, in the event an item/shipment 102 is not successfully picked up or delivered, carrier/transporter personnel/operator can input a corresponding entry (e.g., via a customer computing entity 110) indicating when, where, and/or why the item/shipment 102 was not successfully picked up or delivered (e.g., not home for signature, weather conditions, and/or the like)—which can then be provided by carrier/transporter personnel/operator (e.g., operating user computing entities 120) to a variety of computing entities for storage as item/shipment information/data. Then, an appropriate computing (e.g., carrier/transporter computing entity 100 or a user computing entity 120 operated by carrier/transporter personnel/operator) can provide item/shipment information/data to an electronic door hanger 115 using any of a variety of communication protocols. As will be recognized, the item/shipment information/data may include information/data indicating when, where, and/or why the item/shipment 102 was not successfully picked up or delivered. The item/shipment information/data may include information/data providing instructions, locations, contact information, and/or the like to assist in successfully completing pick-up or delivery of an item/shipment 102. The electronic door hanger 115 may also be provided and receive information/data associated with the corresponding customer's profiles, such as device or entity information/data and/or credentials that may allow registered customers to access the information/data stored by the electronic door hanger 115. With such information/data, carrier/transporter personnel/operator can then leave the electronic door hanger 115 at or proximate the unsuccessful pick-up or delivery location to be discovered locally or remotely by one or more customer computing entities 110 (Block 510 of FIG. 5A). The electronic door hanger 115 can communicate/transmit and/or display (e.g., via the display area/portion) the item/shipment information/data.

In certain embodiments, electronic door hangers 115 can be placed at future pick-up and delivery locations as a "pre-alert" that an item/shipment 102 is scheduled to be picked up or delivered in the near futures (e.g., hours, days, and/or the like). This can allow the consignor or consignee to act and arrange ensure that he or she is available for the pick-up or delivery and/or make alternate arrangements as described in U.S. application Ser. No. 14/025,893, which is hereby incorporated in its entirety by reference.

3. Enrollment/Registration Based Notifications/Messages a. Connection and Enrollment/Registration Based Notifications/Messages In one embodiment, an appropriate computing entity (e.g., carrier/transporter computing entity 100, item 102, vehicle 107, electronic door hanger 115, user computing entity 120, and/or the like) can automatically connect with and communicate item/shipment information/data to customer computing entities 110 for customers registered for notification/message services once an electronic door hanger 115 is placed proximate a pick-up or delivery location (Block 525 of FIG. 5A). In certain embodiments this may also require that an appropriate computing entity (e.g., carrier/transporter computing entity 100, item 102, vehicle 107, electronic door hanger 115, user computing entity 120, and/or the like) be within a range, geofence, zone of confidence, tolerance, and/or the like of the residential or commercial addresses associated with the customer based at least in part on, for example, geocodes, latitude and longitude points, and/or the like associated with the same.

In these embodiments, it will be recognized that certain communication technologies and protocols have range limitations for directly connecting to and/or directly communicating with computing entities (e.g., RFID, point-to-point, peer-to-peer, WLAN, WPAN, and/or the like). For example, various NFC technologies may have range limitations of less than 12-36 inches. Bluetooth technologies may have range limitations from 20 feet to 300 feet. Wi-Fi Direct may have range limitations of 600 feet. LTE and Wi-Max, for example, may have range limitations of 1-30 miles. Thus, depending on the application or context of the notifications/messages desired, various communication technologies and protocols can be used to adapt to various needs and circumstances. For instance, Bluetooth or Wi-Fi Direct technologies may be used for electronic door hangers 115 to connect or communicate with customer computing entities 110 in relatively close proximity (e.g., electronic door hangers 115 placed on a front door that will connect to customer computing entities 110 with the specified range). Similarly, LTE, Wi-Max, and/or other technologies may be used for electronic door hangers 115 to directly or indirectly (e.g., via one or more networks) connect or communicate with customer computing entities 110 and/or carrier/transporter computing entities 100 in remote locations. As will be recognized, a variety of other approaches and techniques can be used to adapt to various needs and circumstances.

In one embodiment, to create a connection between a customer computing entity 110 and an electronic door hanger 115, a trusted relationship can be established between the entities/devices and/or credentials exchanged that can be stored by each device. In the Bluetooth context, establishing a connection with the appropriate credentials available may begin with a phase called "inquiry" through which either an electronic door hanger 115 or a customer computing entity 110 sends an inquiry requesting a response from all capable entities found within its range. The electronic door hangers 115 or customer computing entities 110 within range would then receive the query and reply. The appropriate customer computing entity 110 (with the appropriate credentials) and the electronic door hanger 115 can then establish a connection. As will be recognized, other communication technologies and protocols (e.g., NFC, Wibree, HomeRF, SWAP, Wi-Fi Direct, and/or the like) can be used in a similar manner in terms of connecting and disconnecting with electronic door hangers 115. That is, the other communication technologies and protocols can establish connections between customer computing entities 110 and electronic door hangers 115. In one embodiment, the electronic door hangers 115 or customer computing entities 110 may attempt to establish such connections using the appropriate credentials regularly, periodically, continuously, during certain time periods or time frames, on certain days, upon determining the occurrence of one or more predefined triggers/events, combinations thereof, and/or the like.

In one embodiment, once the computing entities (e.g., carrier/transporter computing entity 100, item 102, vehicle 107, electronic door hanger 115, user computing entity 120, and/or the like) establish a connection or communication, an appropriate computing entity (e.g., carrier/transporter computing entity 100, item 102, vehicle 107, electronic door hanger 115, user computing entity 120, and/or the like) can provide notifications/messages to the customer computing entity 110 regarding successful pick-ups and/or deliveries and/or unsuccessful pick-ups and/or deliveries (Block 530 of FIG. 5A). In certain embodiments, this allows the carrier/transporter personnel/operator being physically present at the delivery point to deliver information/data to the customer. Continuing with the above example, an appropriate computing entity (e.g., carrier/transporter computing entity 100, item 102, vehicle 107, electronic door hanger 115, user computing entity 120, and/or the like) may determine/identify when a customer computing entity 110 and an electronic door hanger 115 registered for notification/message services are connected (e.g., communicating with one another). For instance, assume John Smith has registered for notifications/messages for a pick-up and/or delivery program, and his smartphone and an electronic door hanger 115 on his front door establish a connection with one another (e.g., the entities automatically connect via Bluetooth, Wi-Fi Direct, NFC). Once a connection is established between the entities/devices, an appropriate computing entity (e.g., carrier/transporter computing entity 100, item 102, vehicle 107, electronic door hanger 115, user computing entity 120, and/or the like) can provide one or more notifications/messages in accordance with Mr. Smith's notification/message preferences. For instance, the notifications/messages can be provided by the electronic door hanger 115 and/or the carrier/transporter computing entity 100 using Mr. Smith's notification/message preferences. The same or similar notifications/messages can be displayed through the display area/portion 412 of the electronic door hanger 115 as well. The display area/portion can also display advertisements, invoices, coupons, incentives, and/or the like.

In terms of the notification/message preferences, FIG. 6 shows illustrative notification/message preferences. In these examples, the notification/message preferences include emails for successful deliveries and text messages for successful pick-ups regarding the same. As will be recognized, notifications/messages can be provided for unsuccessful pick-ups and/or deliveries. FIG. 7 shows an embodiment in which an email message is provided by an appropriate computing entity (e.g., carrier/transporter computing entity 100, item 102, vehicle 107, electronic door hanger 115, user computing entity 120, and/or the like) regarding a successful delivery instructing the customer to retrieve his package and the electronic door hanger 115. The notification/message indicates that a package was delivered and that the customer can pick up the package and the electronic door hanger 115 at his front door. FIG. 8 shows an embodiment in which a text message is provided by an appropriate computing entity (e.g., carrier/transporter computing entity 100, item 102, vehicle 107, electronic door hanger 115, user computing entity 120, and/or the like) regarding an unsuccessful delivery. In particular, the text messages indicates that the delivery of the shoes from Company XYZ was unsuccessful, but can be completed by taking the electronic door hanger 115 to the local carrier/transporter facility to retrieve the shoes.

In one embodiment, an electronic door hanger 115 can be used by the carrier/transporter as a "claim ticket" that can be read or scanned to provide the corresponding item/shipment 102 to the customer at a carrier/transporter facility. Such carrier/transporter facilities can be staffed facilities (will call) or unstaffed facilities (e.g., lockers and/or the like). Picking up the corresponding item/shipment 102 may require providing a form of government identification or other acceptable form of identification along with any specified credentials. As will be recognized, a variety of other approaches and techniques can be used to adapt to various needs and circumstances.

b. Proximity and Enrollment/Registration Based Notifications/Messages

In one embodiment, an appropriate computing entity (e.g., carrier/transporter computing entity 100, item 102, vehicle 107, electronic door hanger 115, user computing entity 120, and/or the like) can monitor the location of customer computing entities 110 and automatically communicate item/shipment information/data to customer computing entities 110 for customers registered for notification/message services once an electronic door hanger 115 is placed proximate a pick-up or delivery location. To do so, an appropriate computing entity (e.g., carrier/transporter computing entity 100, item 102, vehicle 107, electronic door hanger 115, user computing entity 120, and/or the like) may monitor the location of one or more corresponding customer computing entities 110 regularly, periodically, continuously, during certain time periods or time frames, on certain days, upon determining the occurrence of one or more predefined triggers/events, combinations thereof, and/or the like (Block 515 of FIG. 5A). The one or more predefined triggers/events may include the electronic door hanger 115 (a) being turned on or off; (b) being activated; (c) being placed on a door; (d) being moved out of a geo-fenced area; (e) being moved into a geo-fenced area; and/or a variety of other triggers/events. As will be recognized, a variety of other triggers/events can be used to adapt to various needs and circumstances.

Generally, the locations of one or more electronic door hangers 115 and/or one or more customer computing entities 120 can be monitored by any of a variety of computing entities—carrier/transporter computing entities 100, electronic door hangers 115, user computing entities 120, and/or the like. For example, the locations of one or more of the electronic door hangers 115 and/or one or more customer computing entities 120 may be monitored with the aid of or in coordination with location-determining devices, location-determining aspects, location-determining features, location-determining functionality, location-determining sensors, and/or other location services. Such may include GPS; cellular-assisted GPS; real time location systems or server technologies using received signal strength indicators from a Wi-Fi network); triangulating positions in connection with a variety of other systems, including cellular towers, Wi-Fi access points, and/or the like; and/or the like. By using the locations of one or more of the electronic door hangers 115 and/or one or more customer computing entities 120, an appropriate computing entity (e.g., carrier/transporter computing entity 100, item 102, vehicle 107, electronic door hanger 115, user computing entity 120, and/or the like) can determine, for example, when an electronic door hanger 115 and/or a customer computing entity 120 are within a configurable distance from one another.

In one embodiment, a configurable distance may be a distance, range, zone of confidence, geofence, tolerance, and/or similar words used herein interchangeably. For example, in one embodiment, the configurable distance may be plus or minus (±) a specific distance or range using a coordinate system (e.g., DD, DMS, UTM, and/or UPS). As will be recognized, a configurable distance may be in a variety of formats, such as degrees, minutes, seconds, feet, meters, miles (e.g., 3, 15, 30, or 50 feet), kilometers, and/or the like. Continuing with the above example, an appropriate computing entity (e.g., carrier/transporter computing entity 100, item 102, vehicle 107, electronic door hanger 115, user computing entity 120, and/or the like) may use a configurable distance of ±0.000001, ±0.000001 in the DD coordinate system (or configurable distances of ±0.000100, ±0.000100 or ±0.000010, ±0.000010) to determine/identify when an electronic door hanger 115 and/or a customer computing entity 120 registered for notification/message services are within a configurable distance of each other. For instance, assume an electronic door hanger is placed on a front door located at 33.7869128, −84.3875602, and a customer computing entity 110 for John Smith (John Smith's phone) is located at 33.7869129, −84.3875601 when he pulls into his driveway. At that point, the two entities would be within the configurable distance of ±0.000001, ±0.000001. An appropriate computing entity (e.g., carrier/transporter computing entity 100, item 102, vehicle 107, electronic door hanger 115, user computing entity 120, and/or the like) monitoring the entities can make this determination/identification.

In the event the two entities are within a configurable distance from each other (e.g., associated with one another), an appropriate computing entity (e.g., carrier/transporter computing entity 100, item 102, vehicle 107, electronic door hanger 115, user computing entity 120, and/or the like) can provide notifications/message regarding successful pick-ups and/or deliveries and/or unsuccessful pick-ups and/or deliveries and/or establish a connection with the corresponding customer computing entity 110 (as previously described)—Block 520 of FIG. 5A. For instance, an appropriate computing entity (e.g., carrier/transporter computing entity 100, item 102, vehicle 107, electronic door hanger 115, user computing entity 120, and/or the like) can provide one or more notifications/messages in accordance with Mr. Smith's notification/message preferences. For instance, the notifications/messages can be provided by the electronic door hanger 115 and/or the carrier/transporter computing entity 100 using Mr. Smith's notification/message preferences. The same or similar notifications/messages can be displayed through the display area/portion 412 of the electronic door hanger 115 as well. The display area/portion can also display advertisements, invoices, coupons, incentives, and/or the like.

As previously described, notifications/messages can be provided for successful pick-ups and/or deliveries and/or unsuccessful pick-ups and/or deliveries. FIG. 7 shows an embodiment in which an email message is provided by an appropriate computing entity (e.g., carrier/transporter computing entity 100, item 102, vehicle 107, electronic door hanger 115, user computing entity 120, and/or the like) regarding a successful delivery instructing the customer to retrieve his package and the electronic door hanger 115. The notification/message indicates that a package was delivered and that the customer can pick up the package and the electronic door hanger 115 at his front door. FIG. 8 shows an embodiment in which a text message is provided by an appropriate computing entity (e.g., carrier/transporter computing entity 100, item 102, vehicle 107, electronic door hanger 115, user computing entity 120, and/or the like) regarding an unsuccessful delivery. In particular, the text messages indicates that the delivery of the shoes from Company XYZ was unsuccessful, but can be completed by taking the electronic door hanger 115 to the local carrier/transporter facility to retrieve the shoes. Further, the electronic door hanger 115 can be used by the carrier/transporter as a "claim ticket" that can be read or scanned to provide the corresponding item/shipment 102 to the customer at the carrier/transporter facility. Picking up the corresponding item/shipment 102 may require providing a form of government identification or other acceptable form of identification along with any specified credentials. As will be recognized, a variety of other approaches and techniques can be used to adapt to various needs and circumstances.

4. Non-Enrollment/Registration Based Notifications/Messages

In one embodiment, an appropriate computing entity (e.g., carrier/transporter computing entity 100, item 102, vehicle 107, electronic door hanger 115, user computing entity 120, and/or the like) can automatically connect with and/or automatically communicate item/shipment information/data to customer computing entities 110 and/or their associated networks (both terms used herein interchangeably) for customers who are not registered/enrolled as described in previous embodiments. This may be advantageous when a carrier/transporter desires to communicate information/data but does not have knowledge beforehand of a customer's electronic destination addresses and/or the like. In certain embodiments this may also require that an appropriate computing entity (e.g., carrier/transporter computing entity 100, item 102, vehicle 107, electronic door hanger 115, user computing entity 120, and/or the like) be within a range, geofence, zone of confidence, tolerance, and/or the like of the residential or commercial addresses associated with the customer based at least in part on, for example, geocodes, latitude and longitude points, and/or the like associated with the same.

a. Open and Non-Registration Based Notifications/Messages

In one embodiment, to do so, once an electronic door hanger 115 has been placed at a pick-up or delivery location, the electronic door hanger 115 can automatically connect to one or more open customer computing entities 110 and/or open associated networks (Blocks 535, 540 of FIG. 5B) within range. In other embodiments, various other computing entities (e.g., carrier/transporter computing entity 100, item 102, vehicle 107, user computing entity 120, and/or the like) can be used in place or in addition to the electronic door hanger 115 as described below. The term open refers to a network or connection that can be joined by anyone (e.g., no credentials are required). For instance, customer computing entities 110 and/or their associated networks (both terms used herein interchangeably) can broadcast identifying information/data (e.g., entity or network name, user friendly name, ID, and/or the like) using a variety of techniques and approaches. For example, the customer computing entities 110 and/or their associated networks can broadcast this information/data using basic service sets (BSSs), extended service sets (ESSs), service set identifiers (SSIDs), Bluetooth inquiry states, and/or a variety of other protocols and techniques. In certain embodiments, in addition to broadcasting identifying information/data (e.g., entity or network name, user friendly name, ID, and/or the like), the customer computing entities 110 and/or their associated networks (both terms used herein interchangeably) can provide the passcode, keys, and/or other credentials necessary for establishing communication to any devices/entities within range. Thus, the devices/entities and networks are open. In one embodiment, each residential or commercial location may have a dedicated customer computing entity 110 and network available for service providers to connect to and provide information/data to the corresponding customers (e.g., to indicate a visit, service, or repair was attempted or made). In these examples, the identifying information/data may comprise the address associated with the residential or commercial location.

In certain embodiments, the electronic door hanger 115 can automatically connect to a customer computing entity 110 and/or an associated network provided that credentials are not required or were received for the same. In other embodiments, various other computing entities can connect to and communicate with the customer computing entity 110. For instance, an open customer computing entity 110 and/or associated network can broadcast its identifying information/data (e.g., entity or network name or ID) and/or credentials using a variety of techniques and approaches. Or the customer computing entity 110 and/or associated network may not require any credentials. The electronic door hanger 115 can then automatically connect to and communicate item/shipment information/data to any open customer computing entities 110 and/or networks within range and with which it is connected. Thus, the electronic door hanger 115 may connect to and communicate with a plurality of customer computing entities 110 and/or networks within its range. For instance, for the open customer computing entities 110 and/or networks, certain communication technologies and protocols (e.g., Wi-Fi Direct, Bluetooth, Wi-Max, LTE, RFID, point-to-point, peer-to-peer, WLAN, WPAN, and/or the like) have range limitations for directly connecting to and/or directly communicating with computing entities via the same. As will be recognized, a variety of other approaches and techniques can be used to adapt to various needs and circumstances.

In one embodiment, once the computing entities (e.g., carrier/transporter computing entity 100, item 102, vehicle 107, electronic door hanger 115, user computing entity 120, and/or the like) establish a connection or communication, an appropriate computing entity (e.g., carrier/transporter computing entity 100, item 102, vehicle 107, electronic door hanger 115, user computing entity 120, and/or the like) can provide notifications/messages to any connected customer computing entities 110 and/or networks regarding successful pick-ups and/or deliveries and/or unsuccessful pick-ups and/or deliveries (Block 545 of FIG. 5B). In certain embodiments, this allows the carrier/transporter personnel/operator being physically present at the delivery point to deliver information/data to the customer. To do so, an appropriate computing entity (e.g., carrier/transporter computing entity 100, item 102, vehicle 107, electronic door hanger 115, user computing entity 120, and/or the like) may first receive an indication that a connection was established and information/data identifying the customer or item/shipment 102. Continuing with the above example, an appropriate computing entity (e.g., carrier/transporter computing entity 100, item 102, vehicle 107, electronic door hanger 115, user computing entity 120, and/or the like) may provide such notifications/messages to all connected customer computing entities 110 and/or networks. For instance, assume John Doe has not registered for notifications/messages for a pick-up and/or delivery program, but his home router, computer, or smartphone (e.g., open customer computing entities 110 and/or networks) and an electronic door hanger 115 on his front door establish a connection with one another (e.g., the entities automatically connect via open Bluetooth, Wi-Fi Direct). Once a connection is established between the entities/devices, an appropriate computing entity (e.g., carrier/transporter computing entity 100, item 102, vehicle 107, electronic door hanger 115, user computing entity 120, and/or the like) can provide one or more notifications/messages regarding attempted (e.g., successful/unsuccessful) pick-ups and/or deliveries. The notifications/messages can be provided by the electronic door hanger 115 and/or the carrier/transporter computing entity 100 to Mr. Doe's customer computing entities 110 and/or networks. The same or similar notifications/messages can be displayed through the display area/portion 412 of the electronic door hanger 115 as well. The display area/portion can also display advertisements, invoices, coupons, incentives, and/or the like. In certain embodiments, only such information/data is provided to the customer computing entity 110 and/or associated network without the electronic door hanger 115 being left or placed at the customer location.

In one embodiment, notifications/messages may include emails, text messages, application-based messages, and/or other types of notifications/messages based on the capabilities of the connected customer computing entities 110 and/or networks. As will be recognized, notifications/messages can be provided for unsuccessful pick-ups and/or deliveries. The notifications/messages can provide information/data about successful pick-ups and/or deliveries and/or unsuccessful pick-ups and/or deliveries. In one embodiment, an electronic door hanger 115 can be used by the carrier/transporter as a "claim ticket" that can be read or scanned to provide the corresponding item/shipment 102 to the customer at a carrier/transporter facility. Such carrier/transporter facilities can be staffed facilities (will call) or unstaffed facilities (e.g., lockers and/or the like). Picking up the corresponding item/shipment 102 may require providing a form of government identification or other acceptable form of identification along with any specified credentials. As will be recognized, a variety of other approaches and techniques can be used to adapt to various needs and circumstances.

b. Closed and Non-Registration Based Notifications/Messages

In one embodiment, once an electronic door hanger 115 has been placed at a pick-up or delivery location, the electronic door hanger 115 can automatically connect to one or more closed customer computing entities 110 and/or closed associated networks (Blocks 535, 540 of FIG. 5B) within range. The term closed refers to a network or connection that required credentials to join. In one embodiment, each residential or commercial location may have a dedicated customer computing entity 110 and network available for service providers to connect to and provide information/data to the corresponding customers (e.g., to indicate a visit, service, or repair was attempted or made). In these examples, the identifying information/data may comprise the address associated with the residential or commercial location.

In one embodiment, certain implementations presume the ability to activate or push a "connection" button (e.g., an actual "connection" button or virtual/soft "connection" button) for a customer computing entity 110 and/or associated network. The actual/physical "connection" button or virtual/soft "connection" button can be used to temporarily open a closed computing entity or network to computing entities/devices for a configurable period of time. Such technologies include Push 'N Connect, Push Button Connect, Push-Button-Connect, and/or similar and/or related technologies. Thus, the actual/physical "connection" button or virtual/soft "connection" button may be a doorbell, a placard, a soft interface, a physical button/key, a virtual/soft button/key, and/or the like. In these examples, a connection button can be pushed or activated on a customer computing entity 110 and/or associated network—including by use of biometrics, facial recognition, and/or the like. For instance, a placard (e.g., comprising a barcode) or doorbell can be positioned at a residence or commercial location that activates a customer computing entity 110 and/or associated network to allow for entities (e.g., an electronic door hanger 115 and/or other devices and entities) to automatically connect to the same for a configurable period of time (e.g., 30 seconds, 2 minutes, and/or the like). During this configurable period of time, the customer computing entity 110 and/or associated network can allow connections from any entities/devices within range (e.g., carrier/transporter computing entities 100, items 102, vehicles 107, electronic door hangers 115, user computing entities 120, and/or the like)—including providing any necessary credentials to the connecting devices/entities.

In one embodiment, once the computing entities (e.g., carrier/transporter computing entity 100, item 102, vehicle 107, electronic door hanger 115, user computing entity 120, and/or the like) establish a connection or communication, an appropriate computing entity (e.g., carrier/transporter computing entity 100, item 102, vehicle 107, electronic door hanger 115, user computing entity 120, and/or the like) can provide notifications/messages to any connected customer computing entities 110 and/or networks regarding successful pick-ups and/or deliveries and/or unsuccessful pick-ups and/or deliveries (Block 545 of FIG. 5B). In certain embodiments, this allows the carrier/transporter personnel/operator being physically present at the delivery point to deliver information/data to the customer. To do so, an appropriate computing entity (e.g., carrier/transporter computing entity 100, item 102, vehicle 107, electronic door hanger 115, user computing entity 120, and/or the like) may first receive an indication that a connection was established and information/data identifying the customer or item/shipment 102. Continuing with the above example, an appropriate computing entity (e.g., carrier/transporter computing entity 100, item 102, vehicle 107, electronic door hanger 115, user computing entity 120, and/or the like) may provide such notifications/messages to all connected customer computing entities 110 and/or networks. For instance, assume John Doe has not registered for notifications/messages for a pick-up and/or delivery program, but his home router, computer, or smartphone (e.g., open customer computing entities 110 and/or networks) and an electronic door hanger 115 on his front door establish a connection with one another (e.g., the entities automatically connect via Bluetooth, Wi-Fi Direct). Once a connection is established between the entities/devices, an appropriate computing entity (e.g., carrier/transporter computing entity 100, item 102, vehicle 107, electronic door hanger 115, user computing entity 120, and/or the like) can provide one or more notifications/messages regarding attempted (e.g., successful/unsuccessful) pick-ups and/or deliveries. The notifications/messages can be provided by the electronic door hanger 115 and/or the carrier/transporter computing entity 100 to Mr. Doe's customer computing entities 110 and/or networks. The same or similar notifications/messages can be displayed through the display area/portion 412 of the electronic door hanger 115 as well. The display area/portion can also display advertisements, invoices, coupons, incentives, and/or the like. In certain embodiments, only such information/data is provided to the customer computing entity 110 and/or associated network without the electronic door hanger 115 being left or placed at the customer location.

In one embodiment, notifications/messages may include emails, text messages, application-based messages, and/or other types of notifications/messages based on the capabilities of the connected customer computing entities 110 and/or networks. As will be recognized, notifications/messages can be provided for unsuccessful pick-ups and/or deliveries. The notifications/messages can provide information/data about successful pick-ups and/or deliveries and/or unsuccessful pick-ups and/or deliveries. In one embodiment, an electronic door hanger 115 can be used by the carrier/transporter as a "claim ticket" that can be read or scanned to provide the corresponding item/shipment 102 to the customer at a carrier/transporter facility. Such carrier/transporter facilities can be staffed facilities (will call) or unstaffed facilities (e.g., lockers and/or the like). Picking up the corresponding item/shipment 102 may require providing a form of government identification or other acceptable form of identification along with any specified credentials. As will be recognized, a variety of other approaches and techniques can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A lockable electronic hanger comprising:
    a first portion defining an integrated opening, wherein the integrated opening is sized and shaped to hang on or around an object;
    a second portion positioned adjacent to and integrally formed with the first portion;
    a locking mechanism; and
    at least one processor and at least one memory including program code located within the first portion or the second portion, wherein the at least one memory and the program code are configured, with the at least one processor, to at least:
        receive an electronic destination address of a user;
        receive carrier-generated information regarding a delivery of an item associated with the user from a carrier computing entity;
        deactivate the locking mechanism to an open configuration in response to receipt of the carrier-generated information regarding the delivery of the item;
        provide a notification to the electronic destination address of the user regarding the delivery of the item in response to receipt of the carrier-generated information; and
        delete the carrier-generated information from the at least one memory based on an instruction from the carrier computing entity requesting deletion of the carrier-generated information.

2. The lockable electronic hanger of claim 1, wherein the locking mechanism at least partially defines the integrated opening, and the locking mechanism is controllable to move between a closed configuration and the open configuration.

3. The lockable electronic hanger of claim 1, wherein the locking mechanism is deactivated remotely by a carrier computing entity.

4. The lockable electronic hanger of claim 1, wherein the locking mechanism is deactivated remotely by a user computing entity.

5. The lockable electronic hanger of claim 1, wherein the locking mechanism is deactivated remotely by a customer computing entity.

6. The lockable electronic hanger of claim 1, wherein the locking mechanism is deactivated locally by a carrier computing entity.

7. The lockable electronic hanger of claim 1, wherein the locking mechanism is deactivated locally by a user computing entity.

8. The lockable electronic hanger of claim 1, wherein the locking mechanism is deactivated locally by a customer computing entity.

9. The lockable electronic hanger of claim 1, further comprising a power supply.

10. The electronic door hanger of claim 1, wherein the electronic door hanger is at least partially constructed from of one or more of Polyethylene Terephthalate (PET or PETE), High Density Polyethylene (HDPE), Plastic Polyvinyl Chloride (PVC), Low Density Polyethylene (LDPE), Polypropylene (PP), or Polystyrene (PS).

11. The electronic door hanger of claim 1, wherein the object is a mailbox.

12. The electronic door hanger of claim 1, wherein the object is a locker.

13. A method for controlling a lockable electronic hanger, the method comprising:
    wirelessly receiving carrier-generated data associated with shipment of an item for a user and an electronic address of the user;
    deactivating a locking mechanism of a lockable electronic hanger to an open configuration subsequent to receiving the carrier-generated data associated with the shipment of the item;
    providing a notification to the electronic destination address of the user based on the carrier-generated data associated with shipment of the item; and
    deleting the carrier-generated information from at least one memory of the lockable electronic hanger based on an instruction from the carrier computing entity requesting deletion of the carrier-generated information subsequent to providing the notification.

14. The method of claim 13, wherein the locking mechanism is deactivated remotely by one of a carrier computing entity, a user computing entity, or a customer computing entity.

15. The method of claim 13, wherein the locking mechanism is deactivated locally by one of a carrier computing entity, a user computing entity, or a customer computing entity.

* * * * *

UNITED STATES PATENT AND TRADEMARK OFFICE
CERTIFICATE OF CORRECTION

PATENT NO. : 11,526,830 B2
APPLICATION NO. : 16/221031
DATED : December 13, 2022
INVENTOR(S) : Robert J. Gillen and Kenneth Bradley Gubler It is certified that error appears in the above-identified patent and that said Letters Patent is hereby corrected as shown below:

On the Title Page

Page 4, Item (2), Other Publications, NPL: reading "Brewin, et al., "Follow that Package!", Article, Computer Worid," should read --Brewin, et al., "Follow that Package!", Article, Computer World,--.

Page 4, Item (8), Other Publications, NPL: reading "us/mobile/label.htm,redirected to http://mobilesolutions.fedex.com/" should read --us/mobile/label.html,redirected to http://mobilesolutions.fedex.com/--.

Page 4, Item (17), Other Publications, NPL: reading "distribution php>, Retrieved on Apr. 16, 2008." should read --distribution.php>, Retrieved on Apr. 16, 2008.--.

Page 5, Item (3), Other Publications, NPL: reading "Puzzle", IBM Developer Works, Article, Retrieved from: URL:http.//" should read --Puzzle", IBM Developer Works, Article, Retrieved from: <URL:http.//--.

In the Specification

Column 5, Line 59:
Reading "ties, application- specific instruction-set processors (ASIPs)," should read --ties, application-specific instruction-set processors (ASIPs),--.

Column 9, Line 21:
Reading "(SOx), Ethylene Oxide (EtO), ozone (03), hydrogen sulfide" should read --(SOx), Ethylene Oxide (EtO), ozone (O3), hydrogen sulfide--.

Column 15, Line 37:
Reading "assistants message (e.g., Google Now, Ski), and/or a variety" should read --assistants message (e.g., Google Now, Siri), and/or a variety--.

Signed and Sealed this
Fifth Day of September, 2023

Katherine Kelly Vidal
*Director of the United States Patent and Trademark Office*

CERTIFICATE OF CORRECTION (continued)
U.S. Pat. No. 11,526,830 B2

Column 15, Line 66:
Reading "payment networks/systems (e.g., PayPal™ Google Wallet," should read --payment networks/systems (e.g., PayPal™, Google Wallet,--.

In the Claims

Column 30, Line 21:
Reading "10. The electronic door hanger of claim 1, wherein the" should read --10. The lockable electronic hanger of claim 1, wherein the--.

Column 30, Line 27:
Reading "11. The electronic door hanger of claim 1, wherein the" should read --11. The lockable electronic hanger of claim 1, wherein the--.

Column 30, Line 29:
Reading "12. The electronic door hanger of claim 1, wherein the" should read --12. The lockable electronic hanger of claim 1, wherein the--.